US009674709B2

(12) United States Patent
Wu et al.

(10) Patent No.: US 9,674,709 B2
(45) Date of Patent: Jun. 6, 2017

(54) METHOD AND DEVICE FOR ACTIVATING CAPACITY STATION BY USING WAVE BEAMS

(71) Applicant: Huawei Technologies Co., Ltd., Shenzhen (CN)

(72) Inventors: Yiqun Wu, Shenzhen (CN); Shunqing Zhang, Shenzhen (CN); Yan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/805,322

(22) Filed: Jul. 21, 2015

(65) Prior Publication Data

US 2015/0327079 A1    Nov. 12, 2015

Related U.S. Application Data

(63) Continuation of application No. PCT/CN2014/071132, filed on Jan. 22, 2014.

(30) Foreign Application Priority Data

Jan. 22, 2013 (CN) .......................... 2013 1 0022678

(51) Int. Cl.
H04B 7/00 (2006.01)
H04W 16/04 (2009.01)
(Continued)

(52) U.S. Cl.
CPC .......... *H04W 16/04* (2013.01); *H04B 7/0617* (2013.01); *H04W 16/28* (2013.01);
(Continued)

(58) Field of Classification Search
CPC ..... H04W 16/28; H04W 88/08; H04W 24/08; H04W 28/0236; H04W 28/10;
(Continued)

(56) References Cited

U.S. PATENT DOCUMENTS

2009/0046582 A1    2/2009 Sarkar et al.
2009/0286547 A1    11/2009 Tangemann
(Continued)

FOREIGN PATENT DOCUMENTS

CN    102378238 A    3/2012
CN    102761880 A    10/2012
(Continued)

OTHER PUBLICATIONS

"Energy Saving solution enhancement," 3GPP TSG RAN WG3 Meeting #72, Barcelona, Spain, R3-111148, $3^{rd}$ Generation Partnership Project, Valbonne, France (May 9-13, 2011).
(Continued)

Primary Examiner — Shaima Q Aminzay
(74) Attorney, Agent, or Firm — Leydig, Voit & Mayer, Ltd.

(57) ABSTRACT

The embodiments of the present invention provide a method and device for activating a capacity station by using wave beams. In some feasible embodiments of the present invention, by setting a set of wave beams to be transmitted for a capacity station in a dormant state, and by transmitting the wave beams in the set of wave beams to be transmitted, load information is collected. According to the covering relation of the capacity station in a dormant state and the set of wave beams to be transmitted and the load information, the capacity station needing to be activated is determined and activated.

15 Claims, 11 Drawing Sheets

(51) Int. Cl.
*H04B 7/06* (2006.01)
*H04W 16/28* (2009.01)
*H04W 52/02* (2009.01)
*H04W 88/08* (2009.01)

(52) U.S. Cl.
CPC ........ *H04W 52/0206* (2013.01); *H04W 88/08* (2013.01); *Y02B 60/50* (2013.01)

(58) Field of Classification Search
CPC ... H04W 28/08; H04W 36/30; H04W 52/322; H04W 92/20
USPC ........ 455/453, 7, 434, 456.1, 500, 509, 522, 455/562.1; 370/230.1, 232, 236, 241.1, 370/534
See application file for complete search history.

(56) References Cited

U.S. PATENT DOCUMENTS

| | | |
|---|---|---|
| 2010/0081439 A1 | 4/2010 | Sie et al. |
| 2011/0223922 A1 | 9/2011 | Kiiski et al. |
| 2012/0142328 A1 | 6/2012 | Awoniyi et al. |
| 2013/0127474 A1 | 5/2013 | Zhang et al. |
| 2014/0050097 A1 | 2/2014 | Zhang et al. |
| 2014/0057623 A1 | 2/2014 | Zhang et al. |
| 2014/0073311 A1 | 3/2014 | Xu et al. |

FOREIGN PATENT DOCUMENTS

| | | |
|---|---|---|
| CN | 102761902 A | 10/2012 |
| WO | WO 2011127851 A2 | 10/2011 |
| WO | WO 2012019547 A1 | 2/2012 |
| WO | WO 2012146295 A1 | 11/2012 |

OTHER PUBLICATIONS

"BS probing evaluation and comparison," 3GPP TSG RAN WG3 Meeting #71, Taipei, Taiwan, R3-110737, 3rd Generation Partnership Project, Valbonne, France (Feb. 21-25, 2011).

"Mechanism for optimised cell wake up in hotspot deployments," 3GPP TSG RAN WG3 Meeting #69-bis, Xi'an, China, R3-102856, 3rd Generation Partnership Project, Valbonne, France (Oct. 11-15, 2010).

METHOD AND DEVICE FOR ACTIVATING CAPACITY STATION BY USING WAVE BEAMS

CROSS-REFERENCE TO RELATED APPLICATIONS

This application is a continuation of International Patent Application No. PCT/CN2014/071132, filed on Jan. 22, 2014, which claims priority to Chinese Patent Application No. 201310022678.5, filed on Jan. 22, 2013, both of which are hereby incorporated by reference in their entireties.

FIELD

The disclosure relates to the field of communication technology, and in particular to a method and device for activating a capacity station by using a beam.

BACKGROUND

With the wide usage of smart mobile terminals, wireless communication services develop from low-speed voice services to high-speed multimedia data services. To satisfy increasing requirements for high capacity and high data rate, cellular network operators actively use wireless access technology with larger capacity and higher transmission rate on one hand, and on the other hand deploy, besides macro base stations with high transmission power to ensure network coverage, small base stations in hotspot areas for enhancing capacity according to features of service distribution, to satisfy local requirements for high capacity and high data rate. For narrative convenience, hereafter the macro base station for ensuring coverage is called as coverage station, and the small base station for enhancing capacity is called as capacity station.

Meanwhile, with the rapid increase of capacity and data rate, people pay more and more attention on the energy consumption problem of the cellular network, particularly, energy consumption of the base station devices, which occupies 80 percent of energy consumption of the entire cellular network. It is proposed to make part of base stations enter into a dormant state in case of low loads of the network, to reduce the energy consumption of the network. In practice, the loads of the network change with time, and in case of low loads of the network, part of capacity stations may be made to enter into the dormant state to save energy, while loads of these capacity stations may be carried by other capacity stations or the coverage station; and in a case that the loads of the network increase, these capacity stations may be re-activated to share the loads of the network. As shown in FIG. 1, which is a schematic structural diagram of a cellular network, usually the loads of network are unevenly distributed over the entire coverage area and are mainly distributed in some regions, thus the loads may be reduced to a proper level by only activating capacity stations in part of the regions. In conventional technology, spatial distribution information of the loads is acquired through signaling interaction among the coverage station, the capacity stations and the users, to determine whether to activate capacity stations at corresponding positions, and all capacity stations generally need to be activated for the signaling interaction, thereby causing extra energy consumption for frequent switches of the states of the capacity stations and the signaling interaction, thus the conventional solutions are not very helpful for reducing the energy consumption of the network. Therefore, a solution, by which capacity stations are efficiently and accurately activated, and the requirements of the network services are satisfied while the energy consumption of the network is reduced, is required.

SUMMARY

A method for activating a capacity station by using a beam and a device thereof are provided according to embodiments of the disclosure, to efficiently and accurately activate a capacity station, and satisfy requirements of network services while energy consumption of a network is reduced.

In a first aspect, the method for activating a capacity station by using a beam is provided according to the disclosure. The method includes:

providing, for capacity stations in a dormant state, a set of beams to be transmitted, in a case that it is detected that load of a coverage station is greater than a predetermined value, where the set of beams to be transmitted includes at least one beam;

transmitting the beams in the set of beams to be transmitted, and collecting load information corresponding to the beams in the set of beams to be transmitted;

determining capacity stations in the dormant state which need to be activated, according to the load information and a coverage relationship between the capacity stations in the dormant state and the set of beams to be transmitted; and activating the determined capacity stations in the dormant state which need to be activated by using the beams in the set of beams corresponding to the determined capacity stations.

In a first possible implementation, the process of providing, for capacity stations in a dormant state, a set of beams to be transmitted includes:

setting the set of beams to be transmitted for the capacity stations in the dormant state according to positions and coverage areas of the capacity stations in the dormant state; or setting a group of beams which is pre-configured by the coverage station as the set of beams to be transmitted.

Combined with the first possible implementation of the first aspect, in a second possible implementation, the process of setting the set of beams to be transmitted for the capacity stations in the dormant state according to positions and coverage areas of the capacity stations in the dormant state includes:

setting one corresponding beam for each capacity station in the dormant state, in a case that a quantity of the capacity stations in the dormant state is smaller than a first pre-set threshold;

where the beams corresponding to the respective capacity stations in the dormant state form the set of beams to be transmitted, and each capacity station in the dormant state and the beam corresponding thereto have a same coverage area.

Combined with the first possible implementation of the first aspect, in a third possible implementation, the process of setting the set of beams to be transmitted for the capacity stations in the dormant state according to positions and coverage areas of the capacity stations in the dormant state includes:

pre-setting a first set number of beams for the capacity stations in the dormant state, in a case that a quantity of the capacity stations in the dormant state is greater than the first pre-set threshold; where if the first set number of beams is greater than a second pre-set threshold, the first set number of beams form the set of beams to be transmitted.

Combined with the third possible implementation of the first aspect, in a fourth possible implementation, the process of setting the set of beams to be transmitted for the capacity stations in the dormant state according to positions and coverage areas of the capacity stations in the dormant state includes:

if the pre-set first set number is smaller than the second pre-set threshold, and part of the capacity stations in the dormant state form at least one cluster of capacity stations, setting one corresponding beam for each cluster of capacity stations in the at least one cluster of capacity stations, in a case that the quantity of the capacity stations in the dormant state is greater than the first pre-set threshold; and setting a second set number of beams for the rest of capacity stations in the dormant state;

where the beams corresponding to each of the at least one cluster of capacity stations and the second set number of beams form the set of beams to be transmitted by using, and each of the at least one cluster of capacity stations and the beam corresponding to the cluster have a same coverage area; and if there are at least two of the capacity stations in the dormant state, of which direction angles are smaller than a third pre-set threshold, the at least two capacity stations of which direction angles are smaller than the third pre-set threshold form one cluster of capacity stations.

Combined with the first aspect, the first possible implementation of the first aspect, the second possible implementation of the first aspect, the third possible implementation of the first aspect or the fourth possible implementation of the first aspect, in a fifth possible implementation, the method further includes: representing the coverage relationship between the capacity stations in the dormant state and the set of beams to be transmitted as an incidence matrix, where a correlation coefficient of the incidence matrix represents a ratio of an area where the coverage area of the capacity station in the dormant state overlaps the coverage area of the beam in the set of beams to be transmitted corresponding to the capacity station, to the coverage area of the capacity station in the dormant state.

Combined with the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation of the first aspect, the process of transmitting the beams in the set of beams to be transmitted includes:

if antennas of the coverage station are all installed on a central transmitting tower in a cell of the coverage station, transmitting the beams in the set of beams to be transmitted through antennas on the central transmitting tower in the cell; and if the antennas of the coverage station are dispersedly installed on at least one transmitting tower in the cell of the coverage station, determining transmitting tower(s) for transmitting the beams in the set of beams to be transmitted from the at least one transmitting tower, and transmitting the beams in the set of beams to be transmitted through the antennas of the determined transmitting tower(s).

Combined with the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation of the first aspect, the process of collecting load information corresponding to the beams in the set of beams to be transmitted includes:

detecting powers of signals received through the set of beams; and acquiring intensities of the loads in the coverage area of the beams in the set of beams according to the powers of the signals received through the set of beams.

Combined with the fifth possible implementation of the first aspect, in an eighth possible implementation, the process of determining capacity stations in the dormant state which need to be activated, according to the load information and a coverage relationship between the capacity stations in the dormant state and the set of beams to be transmitted includes:

for an arbitrary beam in the set of beams, acquiring a capacity station in the dormant state corresponding to the arbitrary beam, in a case that the capacity station in the dormant state corresponding to the arbitrary beam needs to be activated according to load information of the arbitrary beam;

determining whether a capacity station in the dormant state corresponding to a beam adjacent to the arbitrary beam needs to be activated; if the capacity station in the dormant state corresponding to a beam adjacent to the arbitrary beam needs to be activated, acquiring the adjacent beam of which the corresponding capacity station in the dormant state needs to be activated, calculating, for each capacity station in the dormant state corresponding to the arbitrary beam, a sum of correlation coefficient corresponding to the arbitrary beam and correlation coefficient corresponding to the adjacent beam of which the corresponding capacity station in the dormant state needs to be activated, and selecting, from the capacity stations in the dormant state corresponding to the arbitrary beam, a capacity station in the dormant state, which has a maximal sum of correlation coefficients, as the capacity station in the dormant state which needs to be activated with the arbitrary beam; and determining the capacity station in the dormant state with a maximal correlation coefficient which corresponds to the arbitrary beam as the capacity station in the dormant state which needs to be activated with the arbitrary beam, if the capacity station in the dormant state corresponding to the beam adjacent to the arbitrary beam does not need to be activated.

In a second aspect, the device for activating a capacity station by using a beam is provided according to the disclosure. The device includes:

a first unit for setting a set of beams to be transmitted configured to set a set of beams to be transmitted for capacity stations in a dormant state, in a case that it is detected that load of a coverage station is greater than a predetermined value, where the set of beams to be transmitted includes at least one beam;

a first beam transmitting unit configured to transmit the beams in the set of beams to be transmitted;

a load information collection unit configured to collect load information corresponding to the beams in the set of beams to be transmitted;

a first capacity station determining unit configured to determine capacity stations in the dormant state which need to be activated, according to the load information and a coverage relationship between the capacity stations in the dormant state and the set of beams to be transmitted; and a capacity station activating unit configured to activate the determined capacity stations in the dormant state which need to be activated by using the beams in the set of beams corresponding to the determined capacity stations.

In a first possible implementation, the first unit for setting a set of beams to be transmitted includes:

a second unit for setting a set of beams to be transmitted configured to set the set of beams to be transmitted for the capacity stations in the dormant state according to positions and coverage areas of the capacity stations in the dormant state; and a third unit for setting a set of beams to be transmitted, configured to set a group of beams which is pre-configured by the coverage station as the set of beams to be transmitted.

Combined with the first possible implementation of the second aspect, in a second possible implementation, the second unit for setting a set of beams to be transmitted includes:

a fourth unit for setting a set of beams to be transmitted, configured to set one corresponding beam for each capacity station in the dormant state, and form the set of beams to be transmitted by using the beams corresponding to the capacity stations in the dormant state, in a case that a quantity of the capacity stations in the dormant state is smaller than a first pre-set threshold, where each capacity station in the dormant state and the beam corresponding thereto have a same coverage area.

Combined with the first possible implementation of the second aspect, in a third possible implementation, the second unit for setting a set of beams to be transmitted includes:

a fifth unit for setting a set of beams to be transmitted, configured to pre-set a first set number of beams for the capacity stations in the dormant state, in a case that the quantity of the capacity stations in the dormant state is greater than the first pre-set threshold, and if the first set number of beams is greater than a second pre-set threshold, form the set of beams to be transmitted by using the first set number of beams.

Combined with the third possible implementation of the second aspect, in a fourth possible implementation, the second unit for setting a set of beams to be transmitted includes:

a sixth unit for setting a set of beams to be transmitted configured if the pre-set first set number is smaller than the second pre-set threshold, and part of the capacity stations in the dormant state form at least one cluster of capacity stations, to set one corresponding beam for each cluster of capacity stations in at the least one cluster of capacity stations, in a case that the quantity of the capacity stations in the dormant state is greater than the first pre-set threshold; set a second set number of beams for the rest of capacity stations in the dormant state; and form the set of beams to be transmitted by using the beams corresponding to the at least one cluster of capacity stations and the second set number of beams, where each of the at least one cluster of capacity stations and the beam corresponding to the cluster have a same coverage area; and if there are at least two of the capacity stations in the dormant state, of which direction angles are smaller than a third pre-set threshold, the at least two capacity stations of which direction angles are smaller than the third pre-set threshold form one cluster of capacity stations.

Combined with the second aspect, the first possible implementation of the second aspect, the second possible implementation of the second aspect, the third possible implementation of the second aspect or the fourth possible implementation of the second aspect, in a fifth possible implementation, the device further includes:

a coverage relationship representing unit configured to represent the coverage relationship between the capacity stations in the dormant state and the set of beams to be transmitted as an incidence matrix, where a correlation coefficient of the incidence matrix represents a ratio of an area where the coverage area of the capacity station in the dormant state overlaps the coverage area of the beam in the set of beams to be transmitted corresponding to the capacity station, to the coverage area of the capacity station in the dormant state.

Combined with the second aspect, the first possible implementation of the second aspect, the second possible implementation of the second aspect, the third possible implementation of the second aspect, the fourth possible implementation of the second aspect, or the fifth possible implementation, in a sixth possible implementation, the first beam transmitting unit includes:

a second beam transmitting unit configured to transmit the beams in the set of beams to be transmitted through antennas of a central transmitting tower in the cell, if antennas of the coverage station are all installed on the central transmitting tower in the cell in the coverage station;

a transmitting tower determining unit configured to determine, if the antennas of the coverage station are dispersedly installed on at least one transmitting tower in the cell of the coverage station, transmitting tower(s) for transmitting the beams in the set of beams to be transmitted from at least one transmitting tower; and a third beam determining unit is configured to transmit the beams in the set of beams to be transmitted through the antennas of the determined transmitting tower(s).

Combined with the second aspect, the first possible implementation of the second aspect, the second possible implementation of the second aspect, the third possible implementation of the second aspect, the fourth possible implementation of the second aspect, the fifth possible implementation, or the sixth possible implementation, in a seventh possible implementation, the load information collection unit includes:

a power detection unit configured to detect powers of signals received through the set of beams; and a load intensity acquiring unit configured to acquire intensities of the loads in the coverage area of the beams in the set of beams according to the powers of the signals received through the set of beams.

Combined with the fifth implementation of the second aspect, in an eighth implementation, the first capacity station determining unit includes:

a capacity station acquiring unit configured to acquire, for an arbitrary beam in the set of beams, a capacity station in the dormant state corresponding to the arbitrary beam, in a case that the capacity station in the dormant state corresponding to the arbitrary beam needs to be activated according to load information of the arbitrary beam;

a determination unit configured to determine whether a capacity station in the dormant state corresponding to a beam adjacent to the beam needs to be activated;

an adjacent beam acquiring unit configured to acquire the adjacent beam of which the corresponding capacity station in the dormant state needs to be activated, in a case that the determination unit determines that the capacity station in the dormant state corresponding to a beam adjacent to the beam needs to be activated;

a calculation unit configured to calculate, for each capacity station in the dormant state corresponding to the arbitrary beam, a sum of correlation coefficient corresponding to the arbitrary beam and correlation coefficient corresponding to the adjacent beam of which the corresponding capacity station in the dormant state needs to be activated;

a selection unit configured to select, from the capacity stations in the dormant state corresponding to the arbitrary beam, a capacity station in the dormant state, which has a maximal sum of correlation coefficients, as the capacity station in the dormant state which needs to be activated with the beam; and a second capacity station determining unit configured to determine the capacity station in the dormant state with a maximal correlation coefficient which corresponds to the arbitrary beam as the capacity station in the dormant state which needs to be activated with the arbitrary beam, in a case that the determination unit determines that the capacity station in the dormant state corresponding to the beam adjacent to the arbitrary beam does not need to be activated.

In view of above, in some feasible embodiments of the disclosure, a set of beams to be transmitted is provided for capacity stations in a dormant state, beams in the set of beams to be transmitted are transmitted to collect load information, and capacity stations needing to be activated are determined and activated according to a coverage relationship between the capacity stations in the dormant state and the set of beams to be transmitted, and load information, thereby efficiently and accurately activating the capacity stations, and reducing network energy consumption while requirements of network services are satisfied.

BRIEF DESCRIPTION OF THE DRAWINGS

To describe the technical solutions for the embodiments of the present disclosure or technical solutions in conventional technology more clearly, the following briefly describes the drawings involved in the embodiments of the present disclosure or in the conventional technology. Apparently, the drawings described below are some embodiments, and persons of ordinary skill in the art can derive other drawings according to the drawings without any creative effort.

DETAILED DESCRIPTION

Figure 1:
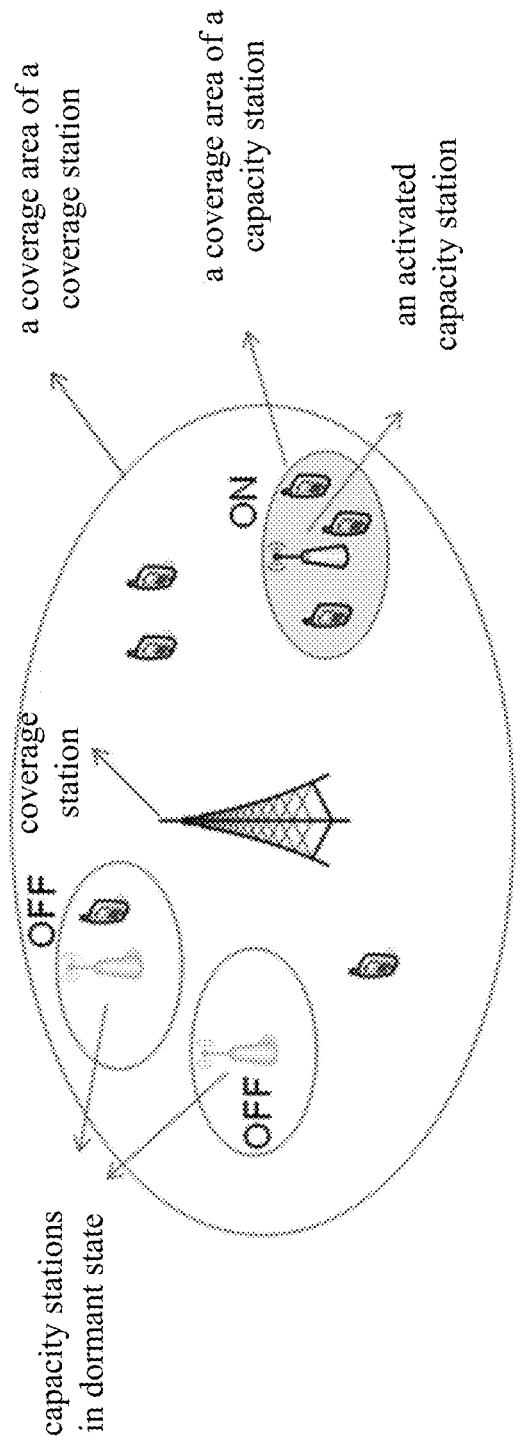
FIG. 1 is a schematic structural diagram of a cellular network.

Technical solutions of the embodiments of the present disclosure will be illustrated completely and clearly with the following drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall in the scope of the present disclosure.

There are three main conventional technical solutions for activating a capacity station as follows.

The first technical solution is an activation solution based on measurements and reports for interference over thermal noise (IoT) by capacity stations, which is proposed in the R3-102856 proposal of the 3rd generation partnership project (3GPP). The first technical solution includes:

step 1, requiring, by a coverage station, all capacity stations in a dormant state, which are within the coverage area of the coverage station, to measure and report IoT, in a case that high loads are detected;

step 2, determining, by the coverage station, capacity stations which need to be activated and capacity stations which do not need to be activated according to magnitudes of IoT reported by the capacity stations; and step 3, transmitting, by the coverage station, activation requests to the capacity stations which need to be activated, according to a result for the determination in step 2, while the capacity stations which do not need to be activated remaining in the dormant state.

In this solution, wireless receiving devices of all capacity stations should be started first for the measurements of IoT. If a capacity station does not need to be activated, the capacity station re-enters into the dormant state. All capacity stations in the dormant state need to be activated for each time the determination is made, and generally, with only a few capacity stations being activated, the network loads may be reduced to a proper level, thus most of the capacity stations reenter into the dormant state. In a case that the network loads dynamically change with time, the capacity stations may frequently switch their states by using this solution. The switch of the state of the capacity station takes a period of time, in which extra energy is consumed. Due to the frequent switches of the states of the capacity stations, extra energy may be consumed, thereby affecting overall energy-saving effect. In addition, a wrong activation decision may be caused, since whether to activate the capacity stations is determined based on the measurements of IoT. In a case that multiple capacity stations are very close to each other, values for IoT, which are measured by the capacity stations, may affect each other, thus in this solution, multiple capacity stations which are very close to each other may all be activated while only one of these capacity stations is actually needed to be activated for a possible optimal strategy.

The second technical solution is an activation solution based on pilot signals transmitted by capacity stations which is proposed in the R3-110737 proposal of the 3GPP. The second technical solution includes:

step 1, notifying, by a coverage station, all capacity stations in a dormant state within the coverage area of the coverage station to transmit pilot signals, in a case that high loads are detected;

step 2, configuring, by the coverage station, part or all of users to measure and report the pilot signals transmitted by the capacity stations;

step 3, determining, by the coverage station, capacity stations which need to be activated and capacity stations which do not need to be activated, according to quantities of switch events in respective capacity stations which are reported by the users; and step 4, transmitting, by the coverage station, activation requests to the capacity stations which need to be activated according to a result for the determination in step 3, while the capacity stations which do not need to be activated remaining in the dormant state.

Similar to the first technical solution, in this solution, transmitting devices for all capacity stations need to be started for transmitting pilot signals. If a capacity station does not need to be activated, the capacity station reenters into the dormant state. Therefore, frequent switches of the states of the capacity stations may be caused, and extra energy may be consumed, thereby affecting overall energy-saving effect. In addition, transmissions of the pilot signals and reporting for the quantities of switch events by the users may cause extra signaling overhead and occupy system resources.

The third technical solution is a technical solution in which cells are activated based on geographic location information of users, which is proposed in a US patent publication No. US2012/0142328A1, disclosed Jun. 7, 2012. The third technical solution includes:

step 1, configuring, by a coverage station, part or all of users to report geographic location information, in a case that high loads are detected;

step 2, determining, by the coverage station, capacity stations which need to be activated and capacity stations which do not need to be activated according to the geographic location information reported by the users;

step 3, transmitting, by the coverage station, activation requests to the capacity stations which need to be activated according to a result for the determination in step 2, while the capacity stations which do not need to be activated remaining in the dormant state.

In this solution, the users need to provide the geographic location information. Generally, an existing mobile device generally has the geographic location information, but it is difficult to acquire real-time accurate geographic location information. The existing mobile device has low precision in locating due to its locating schemes, for example, the global position system can not be used indoors, and the other locating schemes have limited precision. In addition, considering their own privacy, the users are reluctant to provide the geographic location information proactively, and the real-time measurements and reporting for the geographic location information by the users need extra energy and signaling overhead. Furthermore, due to affection of factors such as shadow fading, reflection and refraction, a capacity station geographically closest to the user may not be optimal for the user, which increases the difficulty for determining the capacity station needing to be activated.

A method and device for activating a capacity station by using a beam are provided according to embodiments of the disclosure. In some feasible embodiments of the disclosure, a set of beams to be transmitted is provided for capacity stations in a dormant state, beams in the set of beams to be transmitted are transmitted to collect load information, and capacity stations needing to be activated are determined and activated according to the load information and a coverage relationship between the capacity stations in the dormant state and the set of beams to be transmitted, thereby efficiently and accurately activating the capacity stations, and reducing network energy consumption while satisfying requirements of network services.

Figure 2:
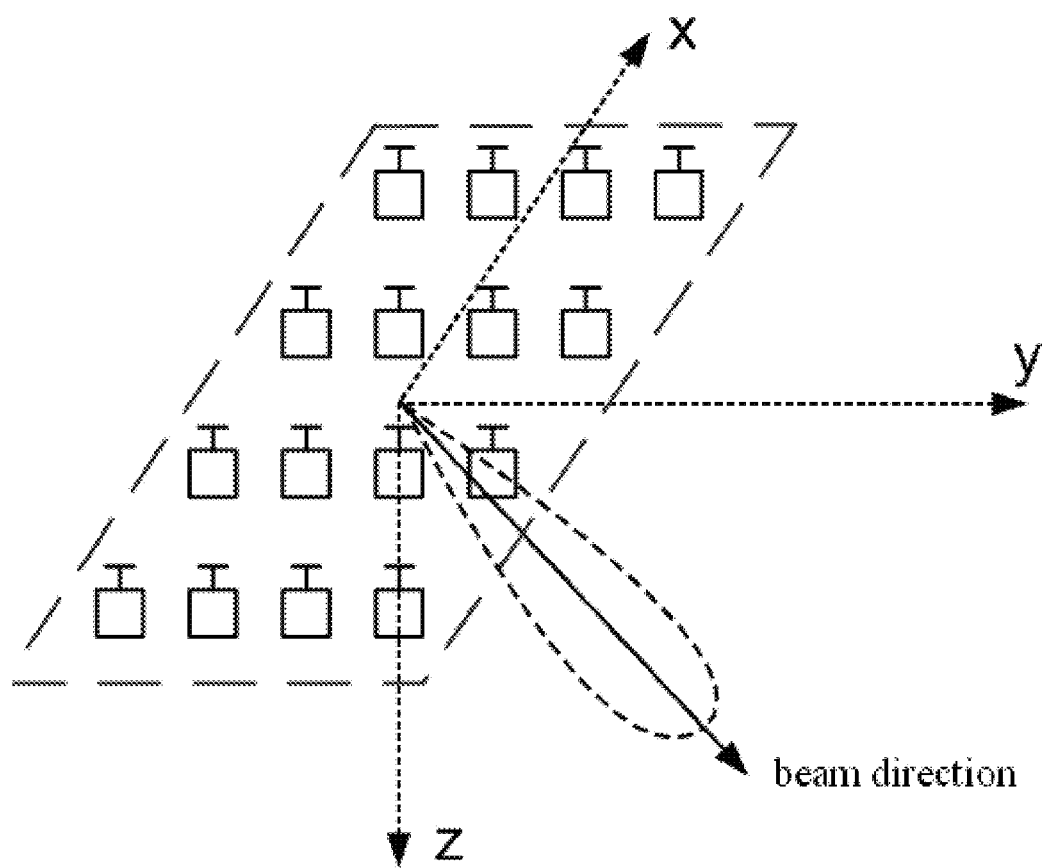
FIG. 2 is a schematic diagram of a three-dimensional beam.

The needed beams according to the disclosure are generated by using the beamforming technology. In the beamforming technology, a directional radiation pattern is created by using the principle of wave interference, so that a wireless device may directionally receive and transmit signals in the three-dimensional space. In a case that different antennas in an antenna array transmit or receive gain amplification signals with different amplitudes and phases, a three-dimensional beam as shown in FIG. 2 may be formed, and the direction angle and the width of the beam depend on settings of gain parameters for the antennas. Since by using the beamforming technology, signal blind areas may be effectively reduced, quality of a useful signal may be improved and an interference signal may be restrained, the beamforming technology is widely applied to existing cellular network systems. The beamforming technology is usually used in transmitting and receiving user data, and is used to assist the capacity stations in performing activation decisions according to the disclosure.

Figure 3:
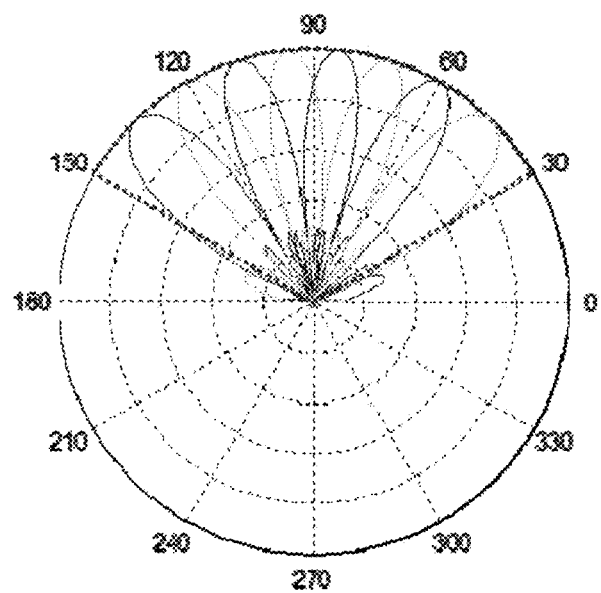
FIG. 3 is a schematic diagram of a SBS solution.
Figure 4:
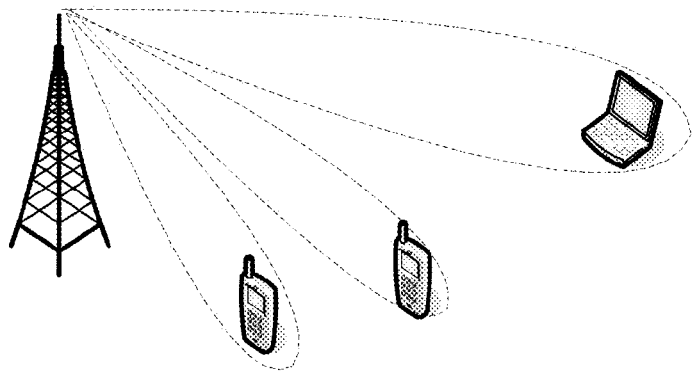
FIG. 4 is a schematic diagram of a AAS solution.

According to difficulty and flexibility, the beamforming technology may be implemented in a switched beam system (SBS) and an adaptive array system (AAS). FIG. 3 is a schematic diagram of a SBS solution. As shown in FIG. 3, in the SBS solution, a group of beams with fixed direction angles and fixed widths is pre-designed, and in a case that user data is transmitted or received, a beam with a strongest signal is selected by switching among the pre-determined beams. FIG. 4 is a schematic diagram of an AAS solution. As shown in FIG. 4, in the AAS solution, by adjusting gains for different antennas, the direction angle and the width of the beam are dynamically designed, so that the peak of the beam points to the users. In comparison, the SBS solution, although being easy-implemented and low-overhead, does not has optimal performance since the peaks of the beams do not point to the users; while the AAS solution, which may has optimal performance in a case that the peak of the beam points to the users, is complex and high-overhead. In addition, the SBS solution may be considered as a special situation for the AAS solution, i.e., beam parameters are selected from a group of fixed parameter sets, to acquire a group of beams with fixed direction angles and fixed widths.

Figure 5:
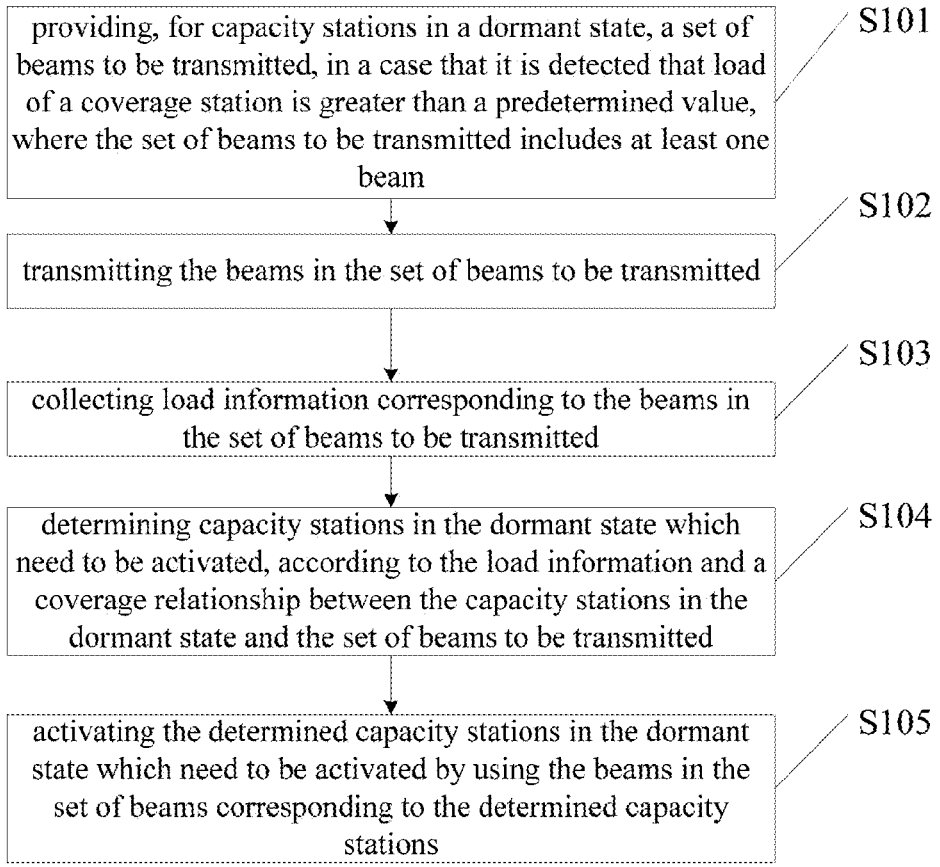
FIG. 5 is a flowchart of a method for activating a capacity station by using a beam according to an embodiment of the disclosure.

FIG. 5 is a flowchart of a method for activating a capacity station by using a beam according to an embodiment of the disclosure. As shown in FIG. 5, the method includes following steps S101 to S105.

Step 101 includes: providing, for capacity stations in a dormant state, a set of beams to be transmitted, in a case that it is detected that load of a coverage station is greater than a predetermined value, where the set of beams to be transmitted includes at least one beam.

A network scenario according to the embodiment is as shown in FIG. 1, the coverage station provides a basic network coverage, the capacity stations are deployed in hotspot areas in the coverage area of the coverage station to enhance capacities, and are completely covered by the coverage station. In a case that part or all of the capacity stations are in the dormant state, and it is detected that the load of the coverage station is relatively high, the method according to the embodiment is used to activate the capacity stations. According to the embodiment, the coverage station and the capacity stations may use a same standard or different standards.

In this step, in a case that it is detected that the load of the coverage station is greater than the predetermined value, a plurality of capacity stations in the dormant state needs to be activated to share the load of the coverage station, thus the set of beams to be transmitted is provided for the capacity stations in the dormant state, where the set of beams to be transmitted includes at least one beam. The set of beams to be transmitted needs to cover all capacity stations in the dormant state. The coverage station is provided with the AAS or the BBS, which may self-adaptively form above beams.

As an implementation, the coverage station is provided with the AAS, and positions, coverage areas, and status of whether or not in the dormant state of all capacity stations are known by the coverage station. The set of beams to be transmitted is provided for the capacity stations in the dormant state according to the positions and the coverage areas of the capacity stations in the dormant state, and the direction angles and the widths of the beams in the set of beams to be transmitted may be dynamically adjusted by configuring gains of antennas.

As another implementation, the coverage station is provided with the SBS, a group of beams which is pre-configured by the SBS of the coverage station is set as the set of beams to be transmitted; and differing from the coverage station provided with the AAS, the coverage station in this implementation no longer sets the set of beams to be transmitted for the capacity stations in the dormant state according to the positions and the coverage areas of the coverage station in the dormant state, but directly uses the pre-configured beams in the SBS of the coverage station. The following steps are the same or similar to those above steps.

Step S102 includes: transmitting the beams in the set of beams to be transmitted.

The beams in the set of beams to be transmitted may be transmitted by the antennas of the coverage station in a conventional way, which is not described herein.

It is should be noted that the antenna system may be centralized or distributed based on different configurations of the antennas of the coverage station. If the centralized antenna system is used by the coverage station, the antennas of the coverage station are all installed on a central transmitting tower in cell of the coverage station, and the coverage station transmits the beams in the set of beams to be transmitted through the antennas of the central transmitting tower in the cell. If the distributed system is used by the coverage station, the antennas of the coverage station are dispersedly installed on at least one transmitting tower in the cell of the coverage station, and the coverage station determines transmitting tower(s) for transmitting the beams in the set of beams to be transmitted from the at least one transmitting tower, and transmits the beams in the set of beams to be transmitted through the antennas of the determined transmitting tower(s).

Step S103 includes: collecting load information corresponding to the beams in the set of beams to be transmitted.

The coverage station transmits the beams in the set of beams to be transmitted, and may directionally collect the load information corresponding to the beams in the set of beams to be transmitted by using the beamforming technology, where the load information includes spatial positions and intensities of the loads. The so called directionality in collecting the load information via the beams means that in a case that the coverage station transmits a signal by using a beam, only load users in the coverage area(s) of capacity station(s) corresponding to the beam may receive the signal, and similarly, in a case that the coverage station receives a signal by using a beam, the coverage station may only receive the signal transmitted by load users in the coverage area(s) of capacity station(s) corresponding to the beam.

Step S104 includes: determining capacity stations in the dormant state which need to be activated, according to the load information and a coverage relationship between the capacity stations in the dormant state and the set of beams to be transmitted.

Based on the collected load information, i.e., the spatial positions and the intensities of the loads, loads needing to be allocated and capacity stations in the dormant state which carry the allocated loads may be comprehensively determined, i.e., the capacity stations in the dormant which need to be activated are determined.

Step S105 includes: activating the determined capacity stations in the dormant state which need to be activated by using the beams in the set of beams corresponding to the determined capacity stations.

The beams in the set of beams which correspond to the capacity stations in the dormant state which need to be activated may be determined according to the coverage relationship between the capacity stations in the dormant state and the set of beams to be transmitted, and the capacity stations in the dormant state which need to be activated and correspond to the beams are activated by using the determined beams.

In the method for activating a capacity station by using a beam according to the embodiment of the disclosure, the set of beams to be transmitted is provided for the capacity stations in the dormant state, the beams in the set of beams to be transmitted are transmitted to collect the load information, and the capacity stations needing to be activated are determined and activated according to the load information and the coverage relationship between the capacity stations in the dormant state and the set of beams to be transmitted, thereby efficiently and accurately activating the capacity stations, and reducing network energy consumption while requirements of network services are satisfied.

Figure 6A:
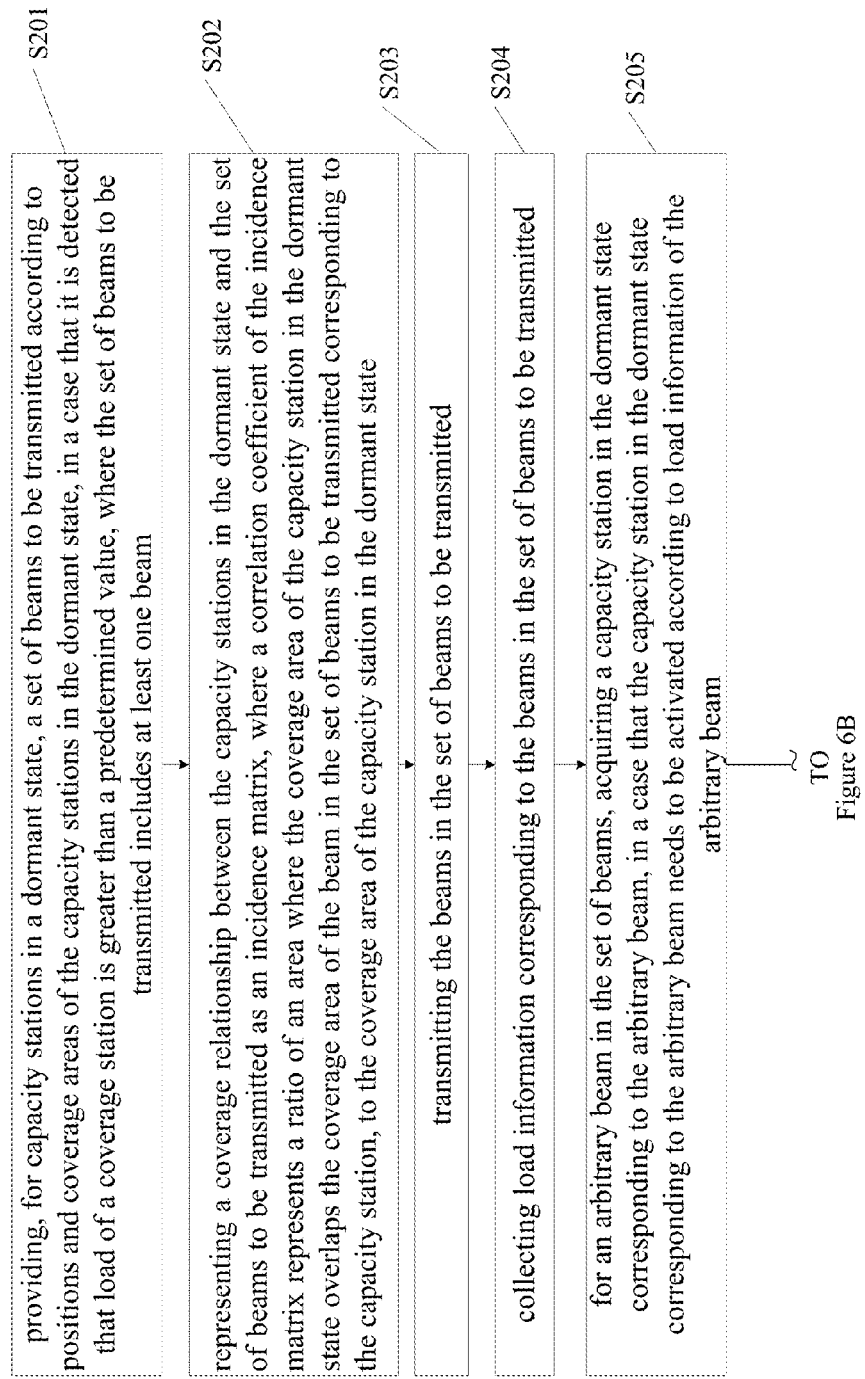
FIG. 6A and FIG. 6B are further detailed flow charts of the method for activating a capacity station by using a beam as shown in FIG. 5 according to an embodiment of the disclosure.
Figure 6B:
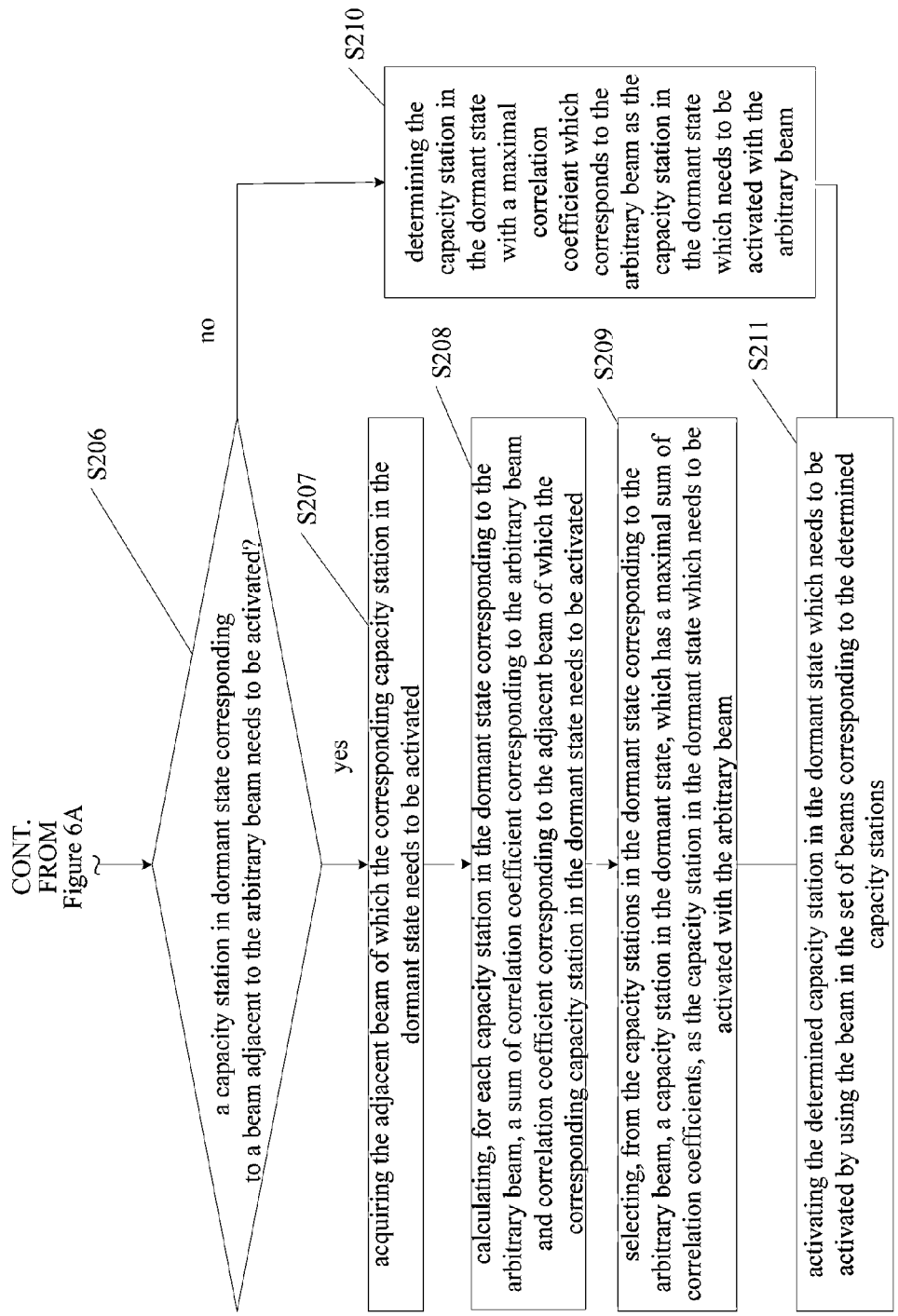

FIG. 6A and FIG. 6B are further detailed flow charts of the method for activating a capacity station by using a beam as shown in FIG. 5 according to an embodiment of the disclosure. As shown in FIG. 6A and FIG. 6B, the method includes following steps S201 to S211.

Step S201 includes: providing, for capacity stations in a dormant state, a set of beams to be transmitted according to positions and coverage areas of the capacity stations in the dormant state, in a case that it is detected that load of a coverage station is greater than a predetermined value, where the set of beams to be transmitted includes at least one beam.

A network scenario according to the embodiment is as shown in FIG. 1, the coverage station provides a basic network coverage, the capacity stations are deployed in hotspot areas in the coverage area of the coverage station to enhance capacities, and are completely covered by the coverage station. In a case that part or all of the capacity stations are in the dormant state, and it is detected that the load of the coverage station is relatively high, the method according to the embodiment is used to activate the capacity stations. According to the embodiment, the coverage station and the capacity stations may use a same standard or different standards.

In the embodiment, the coverage station is provided with the AAS, and the direction angle and the width of the beam may be dynamically adjusted through configuring gains of antennas. Positions, coverage areas, and status of whether or not in the dormant state of all capacity stations are known by the coverage station, and in a case that it is detected that the load of the coverage station is greater than a predetermined value, some capacity stations in the dormant state need to be activated to share the load of the coverage station, thus the set of beams to be transmitted is provided for the capacity stations in the dormant state according to the positions and the coverage areas of the capacity stations in the dormant state, where the set of beams to be transmitted includes at least one beam.

Figure 7:
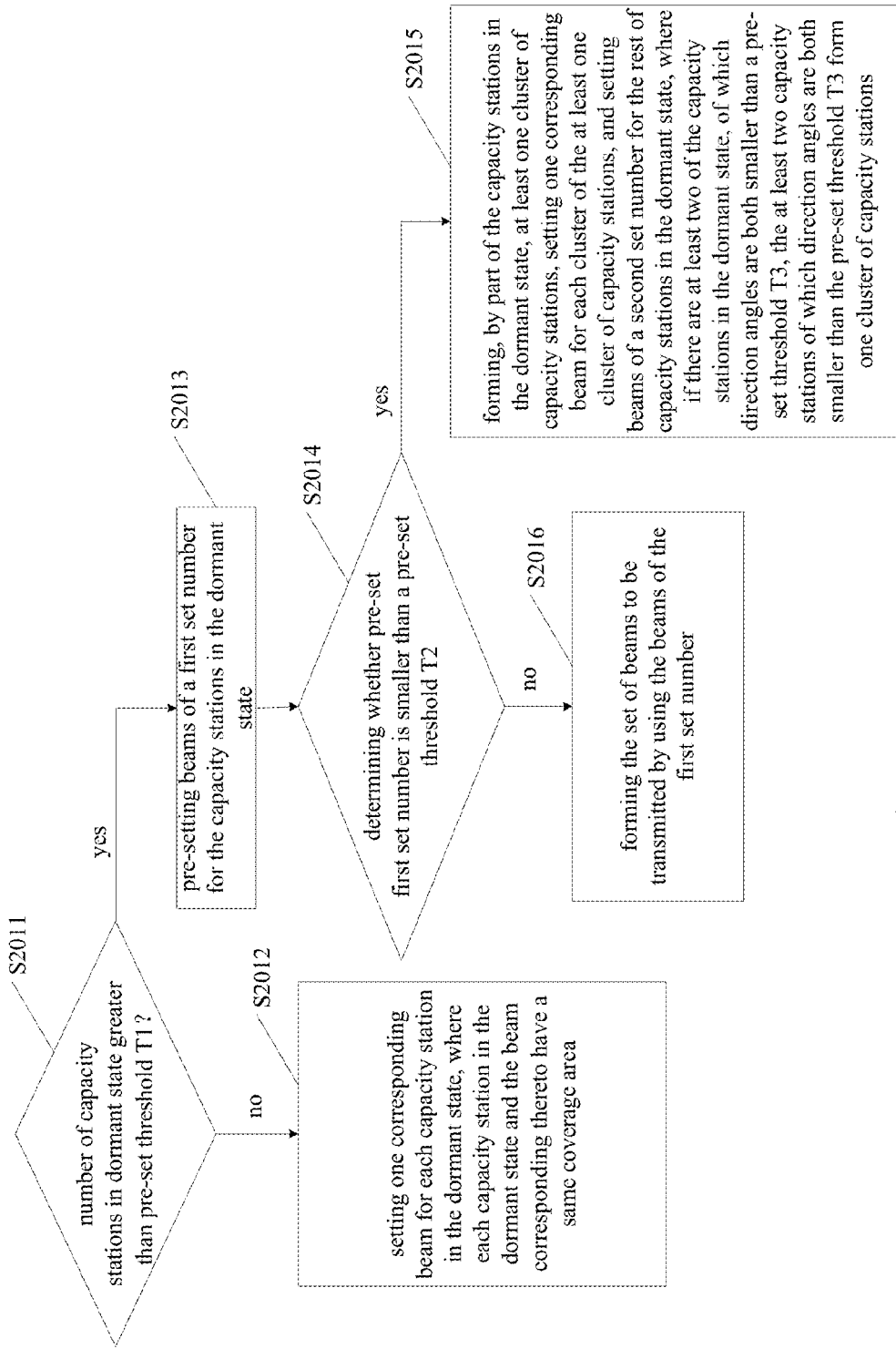
FIG. 7 is a further detailed flow chart of step S201.

Considering overhead and implementation complexity for setting the beams, it is desirable to use less beams to acquire the load information as precisely as possible. FIG. 7 is a further detailed flow chart of step S201. As shown in FIG. 7, step S201 includes step S2011 to step S2015.

Step S2011 includes: determining whether a quantity of the capacity stations in the dormant state is greater than a pre-set threshold T1, if the quantity of the capacity stations in the dormant state is smaller than or equal to the pre-set threshold T1, going to step S2012, and if the quantity of the capacity stations in the dormant state is greater than the pre-set threshold T1, going to step S2013.

This step is used to determine the quantity of the capacity stations in the dormant state, the threshold T1 is pre-set, if the quantity of the capacity stations in the dormant state is small and is smaller than the threshold T1, to simply implement the setting of the beams, the process goes to step S2012; otherwise, the process goes to step S2013.

Step S2012 includes: setting one corresponding beam for each capacity station in the dormant state, where each capacity station in the dormant state and the beam corresponding thereto have a same coverage area.

In this step, due to a small number of capacity stations in the dormant state, to simply implement the setting of the beams, one corresponding beam is provided for each capacity station in the dormant state, and each capacity station in the dormant state and the beam corresponding thereto have a same coverage area.

Step S2013 includes: pre-setting a first set number of beams for the capacity stations in the dormant state.

In this step, the first set number of beams are pre-set for the capacity stations in the dormant state, and the first set number of pre-set beams are able to cover all capacity stations of the coverage station which are in the dormant state.

Step S2014 includes: determining whether the pre-set first set number is smaller than a pre-set threshold T2, if the pre-set first set number is smaller than the pre-set threshold T2, going to step S2015, and if the pre-set first set number is greater than or equal to the pre-set threshold T2, going to step S2016.

In this step, considering overhead and implementation complexity for setting the beams, the pre-set threshold T2 is set, if the pre-set first set number is smaller than the pre-set threshold T2, the process goes to step S2015, so that the number of the beams to be transmitted is small, thereby reducing the overhead for setting beams; and if the pre-set first set number is greater than the pre-set threshold T2, due to a large number of the beams, to simply implement the setting of the beams, the process goes to step S2016, and the first set number of beams are used to form the set of beams to be transmitted.

Step S2015 includes: providing one corresponding beam for each of at least one cluster, where the at least one cluster is formed by part of the capacity stations in the dormant state; and setting a second set number of beams for the rest of capacity stations in the dormant state, where if there are at least two of the capacity stations in the dormant state, of which direction angles are smaller than a pre-set threshold T3, the at least two capacity stations of which direction angles are smaller than the pre-set threshold T3 form one cluster of capacity stations.

Figure 8:
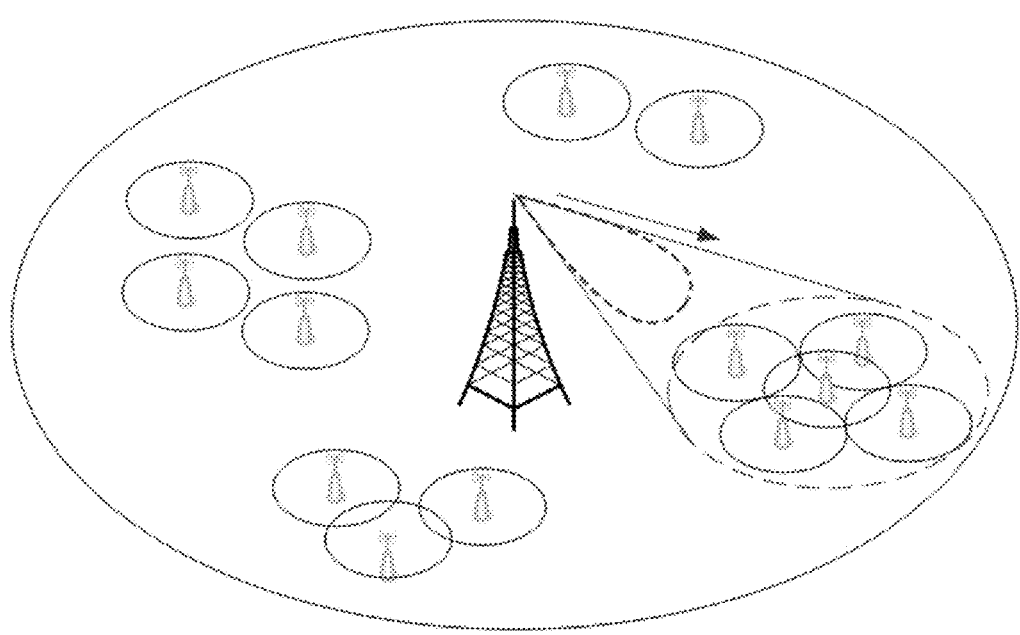
FIG. 8 is a schematic diagram of constitution of a cluster of capacity stations.

In this step, the quantity of the capacity stations in the dormant state is greater than the threshold T1 and is smaller than the threshold T2, i.e., the quantity of the capacity stations in the dormant state is moderate, and to acquire the load information as precisely as possible by using less beams, it is considered that one beam is shared by multiple capacity stations in a cluster consisted of capacity stations in the dormant state which are located at close spatial positions, as shown in FIG. 8. To determine which capacity stations in the dormant state may form the cluster of capacity stations, whether there are at least two of the capacity stations in the dormant state, of which the direction angles are smaller than the pre-set threshold T3, is determined, and if there are at least two of the capacity stations in the dormant state, of which the direction angles are smaller than the pre-set threshold T3, the at least two capacity stations of which the direction angles are smaller than the third pre-set threshold form one cluster of capacity stations.

Part of the capacity stations in the dormant state form at least one cluster of capacity stations, one corresponding beam is provided for each of the at least one cluster, each of the at least one cluster and the beam corresponding thereto have a same coverage area; and the second set number of beams are set for the rest of capacity stations in the dormant state; this is the beam setting for the SBS, in which fixed number of beams are set for the rest of the capacity stations in the dormant state.

The beams corresponding to the respective one of the at least one cluster of capacity stations, together with the second set number of beams, form the set of beams to be transmitted.

Step S2016 includes: forming the set of beams to be transmitted by using the first set number of beams.

This setting is the beam setting for the SBS, in which a fixed number of beams are provided for all the capacity stations in the dormant state.

Step 202 includes: representing a coverage relationship between the capacity stations in the dormant state and the set of beams to be transmitted as an incidence matrix, where a correlation coefficient of the incidence matrix represents a ratio of an area where the coverage area of the capacity station in the dormant state overlaps the coverage area of the beam in the set of beams to be transmitted corresponding to the capacity station, to the coverage area of the capacity station in the dormant state.

The coverage relationship between the coverage areas of the capacity stations in the dormant state and the coverage areas of the beams in the set of beams to be transmitted may be acquired according to these coverage areas. According to the embodiment, the incidence matrix is used to represent the coverage relationship. For example, table 1 is an incidence matrix, as shown in table 1, each row of the matrix corresponds to one capacity station, each column corresponds to one beam, and elements of the incidence matrix are called as the correlation coefficients.

TABLE 1

Example of Incidence matrix

| capacity station | beam | | |
|---|---|---|---|
| | B1 | B2 | B3 |
| #1 | 0.8 | 0 | ... |
| #2 | 1 | 0 | ... |
| #3 | 0.7 | 0.6 | ... |
| #4 | 0 | 1 | ... |
| #5 | 0 | 0.8 | ... |
| ... | ... | ... | ... |

It is possible that the capacity station in the dormant state is not completely covered by the beams and is located at a boundary between two adjacent beams, in this case, activating this capacity station to share the load is less effective than activating the capacity station completely covered by the beams, thus in the embodiment, the correlation coefficient represents the ratio of an area where the coverage area of the capacity station in the dormant state overlaps the coverage area of the beam in the set of beams to be transmitted corresponding to the capacity station, to the coverage area of the capacity station in the dormant state.

As an optional implementation, the incidence matrix is a 0-1 matrix, i.e., in a case that the capacity station is in a region covered by the beams, a corresponding correlation coefficient is 1, and in a case that the capacity station is not in the region covered by the beams, the corresponding correlation coefficient is 0.

As another optional implementation, the correlation coefficient is a continuous variable, used to represent effect of load transfer after the capacity station is activated.

Step S203 includes: transmitting the beams in the set of beams to be transmitted.

The beams in the set of beams to be transmitted are transmitted by the antennas of the coverage station, and the transmission way thereof may be a conventional way, and is not described herein.

It is should be noted that the antenna system may be centralized or distributed based on different configurations of the antennas of the coverage station. If the centralized antenna system is used by the coverage station, the antennas of the coverage station are all installed on a central transmitting tower in the cell of the coverage station, and the coverage station transmits the beams in the set of beams to be transmitted through the antennas of the central transmitting tower in the cell. If the distributed system is used by the coverage station, the antennas of the coverage station are dispersedly installed on at least one transmitting tower in the cell of the coverage station, and the coverage station determines transmitting tower(s) for transmitting the beams in the set of beams to be transmitted from the at least one transmitting tower, and transmits the beams in the set of beams to be transmitted through the antennas of the determined transmitting tower(s).

Step S204 includes: collecting load information corresponding to the beams in the set of beams to be transmitted.

The coverage station transmits the beams in the set of beams to be transmitted, and may directionally collect the load information corresponding to the beams in the set of beams to be transmitted by using the beamforming technology, where the load information includes spatial positions and intensities of the loads. The so called directionality in collecting the load information via the beams means that in a case that the coverage station transmits a signal by using a beam, only load users in the coverage area(s) of capacity station(s) corresponding to the beam may receive the signal, and similarly, in a case that the coverage station receives a signal by using a beam, the coverage station may only receive the signal transmitted by load users in the coverage area(s) of capacity station(s) corresponding to the beam.

Figure 9:
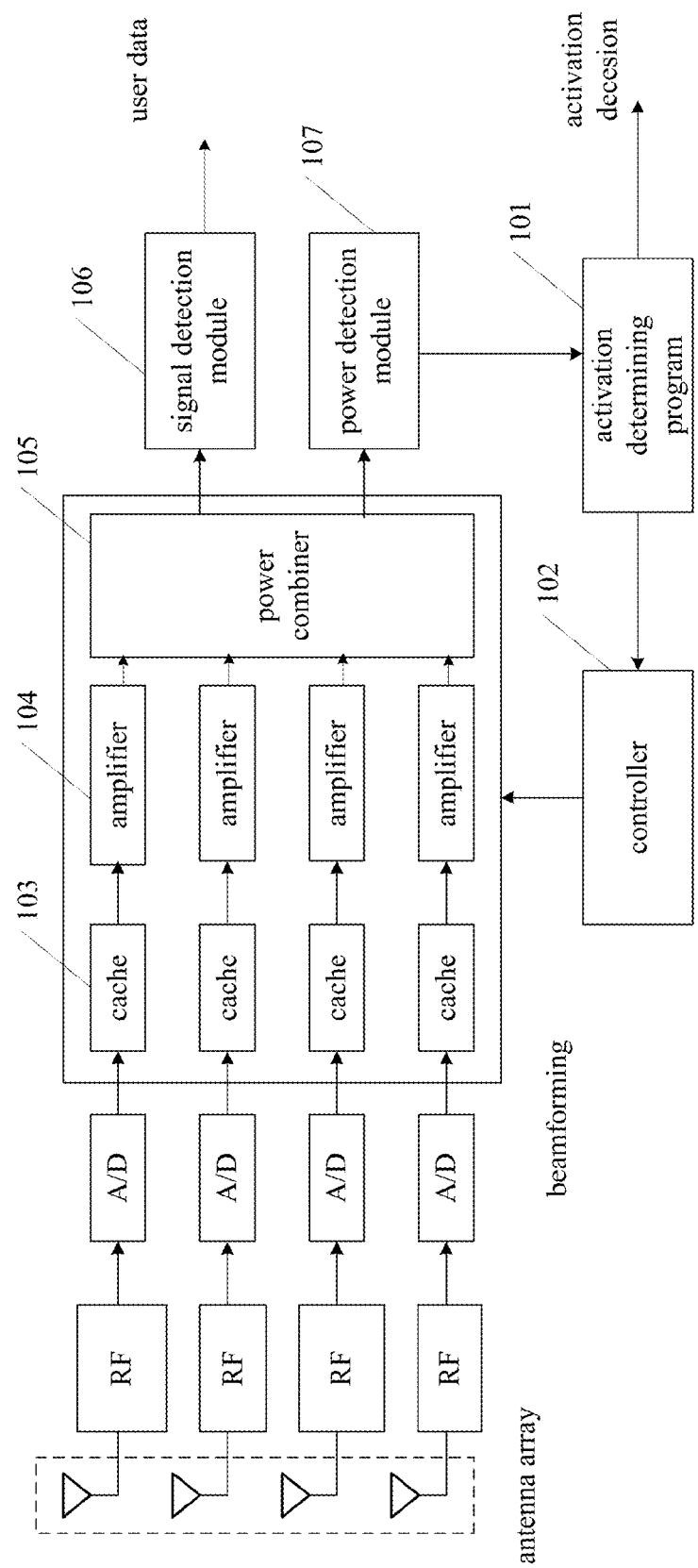
FIG. 9 is a structural block diagram of a receiver of a coverage station which is configured to determine load intensities of respective beams.

FIG. 9 is a structural block diagram of a receiver of a coverage station which is configured to determine load intensities of respective beams. As shown in FIG. 9, in the receiver, an activation determining program 101 sets parameters of a beam through a controller 102, and detects a power of a received signal corresponding to the beam through a power detection module 107, to determine intensities of loads in the coverage area of the beam. It is should be noted that, this configuration does not affect demodulation of user data by a signal detection module 106 of the coverage station. The user data needed by the coverage station may be acquired after a baseband signal in a cache passes through an original signal receiving path. Therefore, in the block diagram, it is only needed to partially increase the complexity of the receiver without making any modification on other parts of the system such as process of control signaling and user terminal devices.

Figure 10:
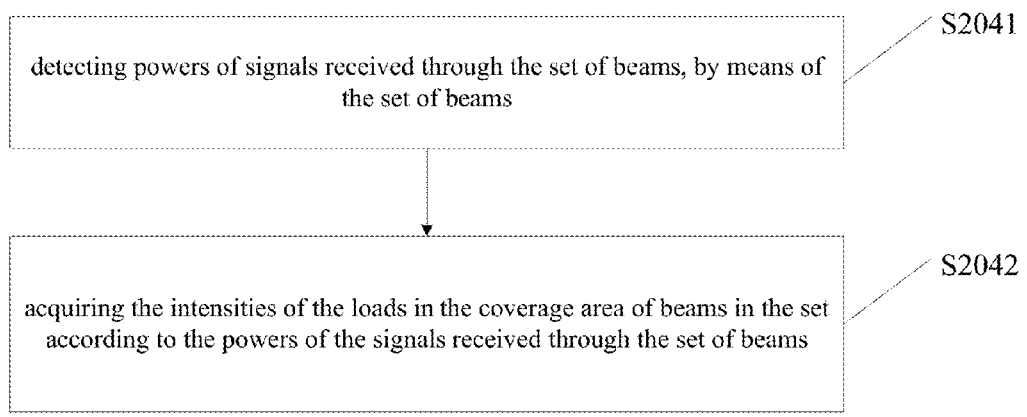
FIG. 10 is a further detailed flow chart of step S204.

FIG. 10 is a further detailed flow chart of step S204. As shown in FIG. 10, combined with the receiver as shown in FIG. 9, step S204 includes following steps S2041 and S2042.

Step S2041 includes: detecting powers of signals received through the set of beams, by means of the set of beams.

The coverage station transmits the beams in the set, and receives, through the receiver as shown in FIG. 9, signals returned by the loads through the set of beams, and the power detection module 107 detects the powers of the signals received through the set of beams.

Step S2042 includes: acquiring the intensities of the loads in the coverage area of beams in the set according to the powers of the signals received through the set of beams.

The power detection module 107 acquires the intensities of the loads in the coverage area of the beams in the set according to the powers of the signals received through the set of beams, and returns the intensities of the loads to the activation determining program 10 for the activation decision.

Step S205 to step S210 are used to determine, according to the load information and the coverage relationship between the capacity stations in the dormant state and the set of beams to be transmitted, the capacity stations in the dormant state which need to be activated.

Step S205 includes: for an arbitrary beam in the set of beams, acquiring a capacity station in the dormant state corresponding to the arbitrary beam, in a case that the capacity station in the dormant state corresponding to the arbitrary beam needs to be activated according to load information of the arbitrary beam.

For the beams in the set, some correspond to capacity stations in the dormant state which need to be activated, while some beams correspond to capacity stations in the dormant state which do not need to be activated, according to the collected load information. Thus, for an arbitrary beam in the set of beams, whether the corresponding capacity station(s) in the dormant state need to be activated is determined according to the load information for the arbitrary beam, and in case of positive determination, the capacity station(s) in the dormant state corresponding to the arbitrary beam is acquired.

Step S206 includes: determining whether a capacity station in the dormant state corresponding to a beam adjacent to the arbitrary beam needs to be activated; if the capacity station in the dormant state corresponding to the beam adjacent to the arbitrary beam needs to be activated, going to step S207; and if the capacity station in the dormant state corresponding to the beam adjacent to the arbitrary beam does not need to be activated, going to step S210.

In the same way as step S205, whether the capacity station(s) in the dormant state corresponding to all beams adjacent to the arbitrary beam need to be activated is determined, in case of positive determination, the process goes to step S207, and in case of negative determination, the process goes to step S210. The adjacent beam(s) refer to all beams of which spatial positions are adjacent to the spatial position of the arbitrary beam.

Step S207 includes: acquiring the adjacent beam of which the corresponding capacity station in the dormant state needs to be activated.

According to the determination in step S206, the capacity stations corresponding to the beams adjacent to the arbitrary beam need to be activated, and these adjacent beams are acquired.

Step S208 includes: calculating, for each capacity station in the dormant state corresponding to the arbitrary beam, a sum of correlation coefficient corresponding to the arbitrary beam and correlation coefficient corresponding to the adjacent beam of which the corresponding capacity station in the dormant state needs to be activated.

For example, based on the example of the incidence matrix as shown in table 1, it is assumed that the arbitrary beam is B1, and the adjacent beam is B2, which is illustrative and there may be more than one adjacent beam. Capacity stations in the dormant state corresponding to beam B1 are #1, #2, #3, #4 and #5, and for each capacity station in the dormant state corresponding to B1, sums of correlation coefficients corresponding to B1 and B2 are calculated. For example, the sum of correlation coefficients of capacity station #1 is 0.8, the sum of correlation coefficients of capacity station #2 is 1, the sum of correlation coefficients of capacity station #3 is 1.3, the sum of correlation coefficients of capacity station #4 is 1, and the sum of correlation coefficients of capacity station #5 is 0.8.

Step S209 includes: selecting, from the capacity stations in the dormant state corresponding to the arbitrary beam, a capacity station in the dormant state, which has a maximal sum of correlation coefficients, as the capacity station in the dormant state which needs to be activated with the arbitrary beam.

For example, capacity station #3 with a maximal sum of correlation coefficients is selected as the capacity station of beam B1 which needs to be activated, according to the sums of correlation coefficients of respective capacity stations in the dormant state corresponding to beam B1, which are calculated in step S208.

Step S210 includes: determining the capacity station in the dormant state with a maximal correlation coefficient which corresponds to the arbitrary beam as the capacity station in the dormant state which needs to be activated with the arbitrary beam.

According to the determination in step S206, the capacity station in the dormant state corresponding to a beam adjacent to the arbitrary beam do not need to be activated, it is determined that the capacity station with a maximal correlation coefficient which is in the dormant state and corresponds to the beam is the capacity station in the dormant state which needs to be activated with the arbitrary beam.

For example, according to the example of the incidence matrix as shown in table 1, it is assumed that the arbitrary beam is B1, capacity stations in the dormant state corresponding to beam B1 are #1, #2, #3, #4 and #5, and correlation coefficients between these capacity stations and beam B1 are 0.8, 1, 0.7, 0 and 0 respectively, then it is determined that capacity station #2 is the capacity station in the dormant state which needs to be activated with the beam B1.

Step S211 includes: activating the determined capacity station in the dormant state which needs to be activated by using the beam in the set of beams corresponding to the determined capacity stations.

It is can be known from step S205 to S210 that the determined capacity station in the dormant state which needs to be activated may correspond to one beam or multiple beams that are adjacent to each other. In step 211, the determined capacity station in the dormant state which needs to be activated is activated by using the beam in the set of beams corresponding to the determined capacity stations.

In the method for activating a capacity station by using a beam according to the embodiments of the disclosure, the set of beams to be transmitted is provided for the capacity stations in the dormant state, the beams in the set of beams to be transmitted are transmitted to collect the load information, and the capacity stations, which may most efficiently share the loads for the coverage station, are selected according to the load information and the coverage relationship between the capacity stations in the dormant state and the set of beams to be transmitted, thereby efficiently and accurately activating the capacity stations, and reducing network energy consumption while requirements of network services are satisfied.

Accordingly, a device for activating a capacity station by using a beam is further provided according to the disclosure.

Figure 11:
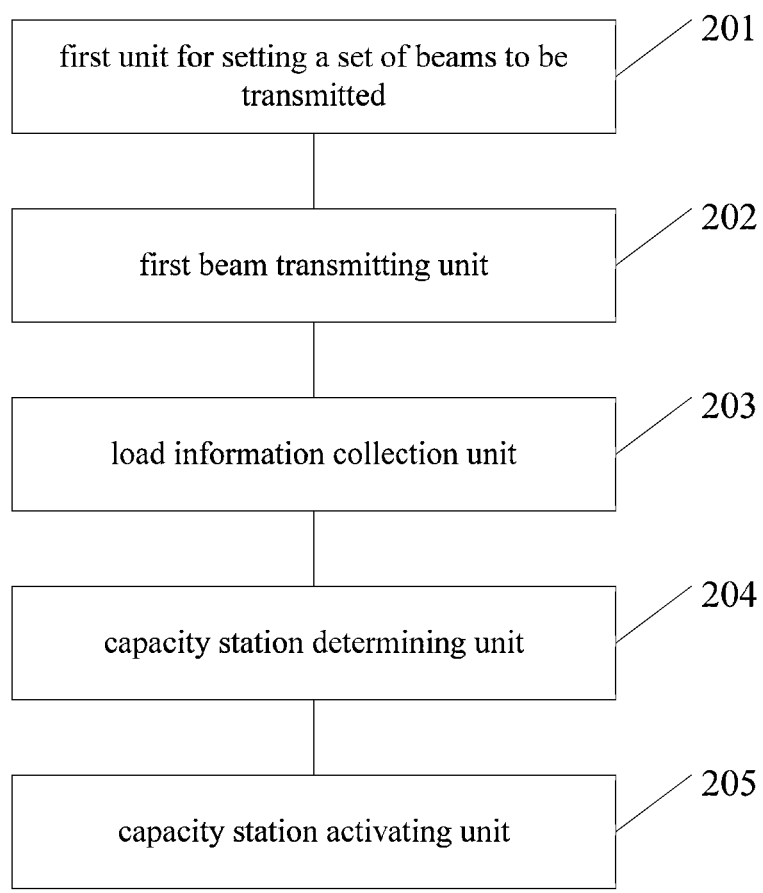
FIG. 11 is a schematic structural diagram of a device for activating a capacity station by using a beam according to an embodiment of the disclosure.

FIG. 11 is a schematic structural diagram of a device for activating a capacity station by using a beam according to an embodiment of the disclosure. As shown in FIG. 11, the device includes following units 201 to 205.

A first unit 201 for setting a set of beams to be transmitted is configured to set a set of beams to be transmitted for capacity stations in a dormant state, in a case that it is detected that load of a coverage station is greater than a predetermined value, where the set of beams to be transmitted includes at least one beam.

A network scenario according to the embodiment is as shown in FIG. 1, the coverage station provides a basic network coverage, the capacity stations are deployed in hotspot areas in the coverage area of the coverage station to enhance capacities, and are completely covered by the coverage station. In a case that part or all of the capacity stations are in the dormant state, and it is detected that the load of the coverage station is relatively high, the method according to the embodiment is used to activate the capacity stations. According to the embodiment, the coverage station and the capacity stations may use a same standard or different standards.

In the first unit 201 for setting a set of beams to be transmitted. in a case that it is detected that the load of the coverage station is greater than the predetermined value, a plurality of capacity stations in the dormant state needs to be activated to share the load of the coverage station, thus the set of beams to be transmitted is provided for the capacity stations in the dormant state, where the set of beams to be transmitted includes at least one beam. The set of beams to be transmitted needs to cover all capacity stations in the dormant state. The coverage station is provided with the AAS or the BBS, which may self-adaptively form above beams.

The first unit 201 for setting a set of beams to be transmitted may includes a second unit for setting a set of beams to be transmitted and a third unit for setting a set of beams to be transmitted.

The second unit for setting a set of beams to be transmitted is configured to set the set of beams to be transmitted for the capacity stations in the dormant state according to positions and coverage areas of the capacity stations in the dormant state. In a case that the coverage station is provided with the AAS, and the positions and the coverage areas of all capacity stations, and the capacity stations in the dormant state are known by the coverage station. The set of beams to be transmitted is provided for the capacity stations in the dormant state according to the positions and the coverage areas of the capacity stations in the dormant state, and the direction angles and the widths of the beams in the set of beams to be transmitted may be dynamically adjusted by configuring gains of antennas.

The third unit for setting a set of beams to be transmitted is configured to set a group of beams which is pre-configured by the coverage station as the set of beams to be transmitted. In a case that the coverage station is provided with the SBS, a group of beams which is pre-configured by the SBS of the coverage station is set as the set of beams to be transmitted; and differing from the coverage station provided with the AAS, the coverage station in this implementation no longer sets the set of beams to be transmitted for the capacity stations in the dormant state according to the positions and the coverage areas of the coverage station in the dormant state, but directly uses the pre-configured beams in the SBS of the coverage station. The following functional modules are the same or similar.

A first beam transmitting unit 202 is configured to transmit the beams in the set of beams to be transmitted.

The beams in the set of beams to be transmitted may be transmitted by the antennas of the coverage station in a conventional way, which is not described herein.

It is should be noted that the antenna system may be centralized or distributed based on different configurations of the antennas of the coverage station. The first beam transmitting unit 202 includes a second beam transmitting unit, a transmitting tower determining unit and a third beam determining unit.

The second beam transmitting unit is configured to transmit the beams in the set of beams to be transmitted through antennas of a central transmitting tower in the cell, if the antennas of the coverage station are all installed on the central transmitting tower in the cell in the coverage station.

The transmitting tower determining unit is configured to determine transmitting tower(s) for transmitting the beams in the set of beams to be transmitted from at least one transmitting tower, if the antennas of the coverage station are dispersedly installed on the at least one central transmitting tower in the cell of the coverage station.

The third beam determining unit is configured to transmit the beams in the set of beams to be transmitted through the antennas of the determined transmitting tower(s).

A load information collection unit 203 is configured to collect load information corresponding to the beams in the set of beams to be transmitted.

The coverage station transmits the beams in the set of beams to be transmitted, and may directionally collect the load information corresponding to the beams in the set of beams to be transmitted by using the beamforming technology, where the load information includes spatial positions and intensities of the loads. The so called directionality in collecting the load information via the beams means that in a case that the coverage station transmits a signal by using the beams, only load users in the coverage area(s) of capacity station(s) corresponding to the beam may receive the signal, and similarly, in a case that the coverage station receives a signal by using a beam, the coverage station may only receive the signal transmitted by load users in the coverage area(s) of capacity station(s) corresponding to the beam.

A first capacity station determining unit 204 is configured to determine capacity stations in the dormant state which need to be activated, according to the load information and a coverage relationship between the capacity stations in the dormant state and the set of beams to be transmitted.

Based on the collected load information, i.e., the spatial positions and the intensities of the loads, loads needing to be allocated and capacity stations in the dormant state which carry the allocated loads may be comprehensively determined, i.e., the capacity stations in the dormant which need to be activated are determined.

The capacity station activating unit 205 is configured to activate the determined capacity stations in the dormant state which need to be activated by using the beam in the set of beams corresponding to the determined capacity stations.

The beams in the set of beams which correspond to the capacity stations in the dormant state which need to be activated may be determined according to the coverage relationship between the capacity stations in the dormant state and the set of beams to be transmitted, and the capacity stations in the dormant state which need to be activated and corresponds to the beam are activated by using the determined beams.

In the device for activating a capacity station by using beams according to the embodiment of the disclosure, the set of beams to be transmitted is provided for the capacity stations in the dormant state, the beams in the set of beams to be transmitted are transmitted to collect the load information, and the capacity stations needing to be activated are determined and activated according to the load information and the coverage relationship between the capacity stations in the dormant state and the set of beams to be transmitted, thereby efficiently and accurately activating the capacity stations, and reducing network energy consumption while requirements of network services are satisfied.

Figure 12:
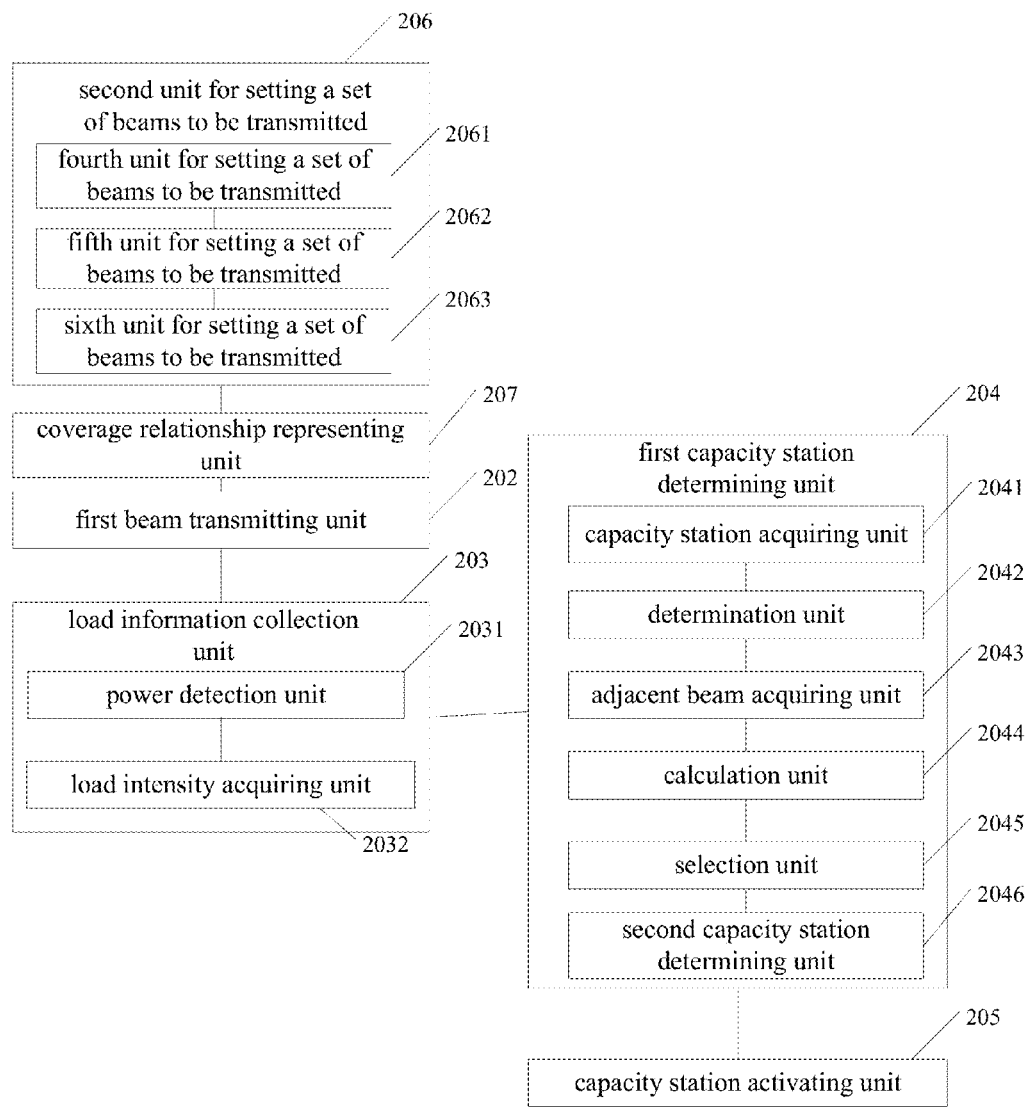
FIG. 12 is a schematic structural diagram of a device which further details the device for activating a capacity station by using a beam as shown in FIG. 11 according to an embodiment of the disclosure.

FIG. 12 is a schematic structural diagram of a device which further details the device for activating a capacity station by using a beam as shown in FIG. 11 according to an embodiment of the disclosure. As shown in FIG. 12, the device includes following units.

A second unit 206 for setting a set of beams to be transmitted is configured to set a set of beams to be transmitted for capacity stations in a dormant state according to positions and coverage areas of the capacity stations in the dormant state, in a case that it is detected that loads of a coverage station are high.

A network scenario according to the embodiment is as shown in FIG. 1, the coverage station provides a basic network coverage, the capacity stations are deployed in hotspot areas in the coverage area of the coverage station to enhance capacities, and are completely covered by the coverage station. In a case that part or all of the capacity stations are in the dormant state, and it is detected that the load of the coverage station is relatively high, the method according to the embodiment is used to activate the capacity stations. According to the embodiment, the coverage station and the capacity stations may use a same standard or different standards.

In the embodiment, the coverage station is provided with the AAS, and the direction angle and the width of the beam may be dynamically adjusted through configuring gains of antennas. Positions, coverage areas, and status of whether or not in the dormant state of all capacity stations are known by the coverage station, and in a case that it is detected that the load of the coverage station is greater than a predetermined value, a plurality of capacity stations in the dormant state need to be activated to share the load of the coverage station, thus the set of beams to be transmitted is provided for the capacity stations in the dormant state according to the positions and the coverage areas of the capacity stations in the dormant state, where the set of beams to be transmitted includes at least one beam.

Considering overhead and implementation complexity for setting the beams, it is desirable to use less beams to acquire the load information as precisely as possible. The second unit 206 for setting a set of beams to be transmitted includes a fourth unit 2061 for setting a set of beams to be transmitted, a fifth unit 2062 for setting a set of beams to be transmitted and a sixth unit 2063 for setting a set of beams to be transmitted.

The fourth unit 2061 for setting a set of beams to be transmitted is configured to set one corresponding beam for each capacity station in the dormant state, and form the set of beams to be transmitted by using the beams corresponding to the capacity stations in the dormant state, in a case that a quantity of the capacity stations in the dormant state is smaller than a first pre-set threshold, where each capacity station in the dormant state and the beam corresponding thereto have a same coverage area.

The fifth unit 2062 for setting a set of beams to be transmitted is configured to pre-set a first set number of beams for the capacity stations in the dormant state, in a case that the quantity of the capacity stations in the dormant state is greater than the first pre-set threshold; and form the set of beams to be transmitted by using the first set number of beams, if the first set number of beams is greater than a second pre-set threshold.

The sixth unit 2063 for setting a set of beams to be transmitted is configured to if the pre-set first set number is smaller than the second pre-set threshold, and part of the capacity stations in the dormant state form at least one cluster of capacity stations, set one corresponding beam for each cluster of capacity stations in the at least one cluster of capacity stations, in a case that the quantity of the capacity stations in the dormant state is greater than the first pre-set threshold; set a second set number of beams for the rest of capacity stations in the dormant state; and form the set of beams to be transmitted by using the beams corresponding to the at least one cluster of capacity stations and the second set number of beams, where each of the at least one cluster of capacity stations and the beam corresponding thereto have a same coverage area; and if there are at least two of the capacity stations in the dormant state, of which direction angles are smaller than a pre-set threshold T3, and the at least two capacity stations of which direction angles are smaller than the pre-set threshold T3 form one cluster of capacity stations.

A coverage relationship representing unit 207 is configured to represent the coverage relationship between the capacity stations in the dormant state and the set of beams to be transmitted as an incidence matrix, where a correlation coefficient of the incidence matrix represents a ratio of an area where the coverage area of the capacity station in the dormant state overlaps the coverage area of the beam in the set of beams to be transmitted corresponding to the capacity station, to the coverage area of the capacity station in the dormant state.

The coverage relationship between the coverage areas of the capacity stations in the dormant state and the coverage areas of the beams in the set of beams to be transmitted may be acquired according to these coverage areas. According to the embodiment, the incidence matrix is used to represent the coverage relationship. For example, table 1 is an incidence matrix, as shown in table 1, each row of the matrix corresponds to one capacity station, each column corresponds to one beam, and elements of the incidence matrix are called as the correlation coefficients.

It is possible that the capacity station in the dormant state is not completely covered by the beams and is located at a boundary between two adjacent beams, in this case, activating this capacity station to share the load is less effective than activating the capacity station completely covered by the beams, thus in the embodiment, the correlation coefficient represents ratio of an area where the coverage area of the capacity station in the dormant state overlaps the coverage area of the beam in the set of beams to be transmitted corresponding to the capacity station, to the coverage area of the capacity station in the dormant state.

As an optional implementation, the incidence matrix is a 0-1 matrix, i.e., in a case that the capacity station is in a region covered by the beams, a corresponding correlation coefficient is 1, and in a case that the capacity station is not in the region covered by the beams, the corresponding correlation coefficient is 0.

As another optional implementation, the correlation coefficient is a continuous variable, used to represent effect of load transfer after the capacity station is activated.

A first beam transmitting unit 202 is configured to transmit the beams in the set of beams to be transmitted.

The beams in the set of beams to be transmitted are transmitted by the antennas of the coverage station, and the transmission way thereof may be a conventional way, and is not described herein.

It is should be noted that the antenna system may be centralized or distributed based on different configurations of the antennas of the coverage station. The first beam transmitting unit 202 includes a second beam transmitting unit, a transmitting tower determining unit and a third beam determining unit.

The second beam transmitting unit is configured to transmit the beams in the set of beams to be transmitted through antennas of a central transmitting tower in the cell, if the antennas of the coverage station are all installed on the central transmitting tower in the cell in the coverage station.

The transmitting tower determining unit is configured to determine transmitting tower(s) for transmitting the beams in the set of beams to be transmitted from at least one transmitting tower, if the antennas of the coverage station are dispersedly installed on the at least one central transmitting tower in the cell of the coverage station.

The third beam determining unit is configured to transmit the beams in the set of beams to be transmitted through the antennas of the determined transmitting tower(s).

A load information collection unit 203 is configured to collect load information corresponding to the beams in the set of beams to be transmitted.

The coverage station transmits the beams in the set of beams to be transmitted, and may directionally collect the load information corresponding to the beams in the set of beams to be transmitted by using the beamforming technology, where the load information includes spatial positions and intensities of the loads. The so called directionality in collecting the load information via the beams means that in a case that the coverage station transmits a signal by using a beam\, only load users in the coverage area(s) of capacity station(s) corresponding to the beam may receive the signal, and similarly, in a case that the coverage station receives a signal by using a beam, the coverage station may only receive the signal transmitted by load users in the coverage area(s) of capacity station(s) corresponding to the beam.

FIG. 9 is a structural block diagram of a receiver of a coverage station which is configured to determine load intensities of respective beams. As shown in FIG. 9, in the receiver, an activation determining program 101 sets parameters of a beam through a controller 102, and detects a power of a received signal corresponding to the beam through a power detection module 107, to determine intensities of loads in the coverage area of the beam. It is should be noted that, this configuration does not affect demodulation of user data by a signal detection module 106 of the coverage station. The user data needed by the coverage station may be acquired after a baseband signal in a cache passes through a conventional signal receiving path. Therefore, in the block diagram, it is only needed to partially increase the complexity of the receiver without making any modification on other parts of the system such as process of control signaling and user terminal devices.

The load information collection unit 203 may include a power detection unit 2031 and a load intensity acquiring unit 2032.

The power detection unit 2031 is configured to detect powers of signals received through the set of beams to be transmitted, by means of the set of beams.

The coverage station transmits the beams in the set of beams, and receives, through the receiver as shown in FIG. 9, signals returned by the loads through the set of beams to be transmitted, and the power detection module 107 detects the powers of the signals received through the set of beams to be transmitted.

The load intensity acquiring unit 2032 is configured to acquire the intensities of the loads in the coverage area of beams in the set according to the powers of the signals received through the set of beams.

The power detection module 107 acquires the intensities of the loads in the coverage area of the beams in the set of beams according to the powers of the signals received through the set of beams, and returns the intensities of the loads to the activation determining program 10 for the activation decision.

A first capacity station determining unit 204 is configured to determine the capacity stations in the dormant state which need to be activated, according to the load information and the coverage relationship between the capacity stations in the dormant state and the set of beams to be transmitted. The first capacity station determining unit 204 includes a capacity station acquiring unit 2041, a determination unit 2042, an adjacent beam acquiring unit 2043, a calculation unit 2044, a selection unit 2045 and a second capacity station determining unit 2046.

The capacity station acquiring unit 2041 is configured to, for an arbitrary beam in the set of beams, acquire a capacity station in the dormant state corresponding to arbitrary beam, in a case that the capacity station in the dormant state corresponding to the arbitrary beam needs to be activated according to load information of the arbitrary beam.

The determination unit 2042 is configured to determine whether a capacity station in the dormant state corresponding to a beam adjacent to the arbitrary beam needs to be activated.

The adjacent beam acquiring unit 2043 is configured to acquire the adjacent beam of which the corresponding capacity station in the dormant state needs to be activated, in a case that the determination unit determines that the capacity station in the dormant state corresponding to the beam adjacent to the arbitrary beam needs to be activated.

The calculation unit 2044 is configured to calculate, for each capacity station in the dormant state corresponding to the arbitrary beam, a sum of correlation coefficient corresponding to the arbitrary beam and correlation coefficient corresponding to the adjacent beam of which the corresponding capacity station in the dormant state needs to be activated.

The selection unit 2045 is configured to, from the capacity stations in the dormant state corresponding to the arbitrary beam, a capacity station in the dormant state, which has a maximal sum of correlation coefficients, as the capacity station in the dormant state which needs to be activated with the arbitrary beam.

The second capacity station determining unit 2046 is configured to determine the capacity station in the dormant state with a maximal correlation coefficient which corresponds to the arbitrary beam as the capacity station in the dormant state which needs to be activated with the arbitrary beam, in a case that the determination unit determines that the capacity station in the dormant state corresponding to the beam adjacent to the arbitrary beam do not need to be activated.

The capacity station activating unit 205 is configured to activate the determined capacity station in the dormant state which needs to be activated by using the beam in the set of beams corresponding to the determined capacity stations.

The beams in the set of beams which correspond to the capacity stations which need to be activated may be determined according to the coverage relationship between the capacity stations in the dormant state and the set of beams to be transmitted, and the corresponding capacity stations in the dormant state which need to be activated are activated by using the determined beams.

In the device for activating a capacity station by using a beam according to the embodiments of the disclosure, the set of beams to be transmitted is provided for the capacity stations in the dormant state, the beams in the set of beams to be transmitted are transmitted to collect the load information, and the capacity stations, which may most efficiently share the loads for the coverage station, are selected according to the load information and the coverage relationship between the capacity stations in the dormant state and the set of beams to be transmitted thereby efficiently and accurately activating the capacity stations, and reducing network energy consumption while requirements of network services are satisfied.

The person of skills in the art may clearly understand that to describe conveniently and simply, specific operating processes of the foregoing devices and modules may refer to corresponding processes of the methods according to the embodiments of the disclosure and are not described herein.

It is should be understood that the disclosed methods and devices according to the embodiments of the disclosure may be implemented in other ways. The described devices according to the embodiments are only illustrative, for example, the division of the modules is only a division of logic functions, and the modules may be divided in other ways in a practical implementation, for example, multiple modules or components may be combined or integrated in another device, or some features may be omitted or may not be executed. In addition, the shown or described coupling, direct coupling or communication connections may be performed indirectly through communication interfaces, devices or modules, and may be electrical, mechanical or in other forms.

The modules described as separate components may or may not be separated physically, the components shown as modules may or may not be physical units, and may be located at one place, or may be distributed at multiple network units. Part or all of the modules may be selected as needed to achieve the purpose of the solutions according to the embodiments.

Furthermore, the function modules according to the embodiments of the disclosure may be integrated in one processing module, may be physically separated, or may have two or more modules which are integrated in one module.

It is should be noted that the above embodiments are only used to illustrate the technical solutions of the disclosure and are not meant to limit the technical solutions. Although the disclosure is described in detail with reference to the foregoing embodiments, it should be understood by persons of skills in the art that some modifications may be made on the technical solutions of the embodiments, or equivalent alternations may be made on part or all of features of the technical solutions, and with these modifications and alternations, the essence of corresponding technical solutions does not depart from the scope of the technical solutions of the embodiments of the disclosure.

What is claimed is:

1. A method for a coverage station to activate dormant capacity stations which need to be activated, comprising:
    setting beams for dormant capacity stations according to positions and coverage areas of the dormant capacity stations when it is detected that a load of the coverage station is greater than a predetermined value;
    transmitting the beams and collecting load information corresponding to the beams;
    determining dormant capacity stations which need to be activated according to the load information and a coverage relationship between the dormant capacity stations and the beams; and
    activating the dormant capacity stations which need to be activated using respective beams corresponding to the dormant capacity stations which need to be activated;
    wherein when a quantity of dormant capacity stations is smaller than a first preset threshold, setting the beams for dormant capacity stations further comprises:
        setting one beam for each dormant capacity station, wherein each respective dormant capacity station has a same coverage area as the beam corresponding to the respective dormant capacity station.

2. The method according to claim 1, wherein transmitting the beams comprises:
    if antennas of the coverage station are all installed on a central transmitting tower in a cell of the coverage station, transmitting the beams through the central transmitting tower; or
    if the antennas of the coverage station are dispersedly installed on at least one transmitting tower in the cell of the coverage station, determining transmitting tower(s) for transmitting the beams from the at least one transmitting tower, and transmitting the beams through the antennas of the determined transmitting tower(s).

3. The method according to claim 1, wherein collecting load information corresponding to the beams comprises:
    detecting powers of signals received through the beams; and
    acquiring intensities of the loads in the coverage area of the beams according to the powers of the signals received through the beams.

4. A coverage station for activating dormant capacity stations which need to be activated, comprising a transmitter, a processor and a memory having processor-executable instructions stored therein, wherein the processor is configured, based on execution of the processor-executable instructions to:
    beams for dormant capacity stations according to positions and coverage areas of the dormant capacity stations when it is detected that a load of the coverage station is greater than a predetermined value;
    control the transmitter to transmit the beams;
    collect load information corresponding to the beams;
    determine dormant capacity stations which need to be activated according to the load information and a coverage relationship between the dormant capacity stations and the beams; and
    activate the dormant capacity stations which need to be activated using respective beams corresponding to the dormant capacity stations which need to be activated;
    wherein setting beams for the dormant capacity station further comprises:
        if a quantity of the dormant capacity stations is smaller than a first pre-set threshold, setting one beam for each dormant capacity station, wherein each respective dormant capacity station has a same coverage area as the beam corresponding to the respective dormant capacity station; and
        if the quantity of the capacity stations in the dormant state is greater than the first pre-set threshold, pre-setting a first number of beams for the dormant capacity stations, and if the first number of beams is greater than a second pre-set threshold, forming the beams using the first number of beams.

5. The coverage station according to claim 4, wherein the processor is further configured to:
    if the pre-set first number is smaller than the second pre-set threshold, and part of the dormant capacity stations form at least one cluster of capacity stations, set one corresponding beam for each cluster of capacity stations in at the least one cluster of capacity stations, when the quantity of the dormant capacity stations is greater than the first pre-set threshold; set a second number of beams for the rest of the dormant capacity stations; and form the beams using the beams corresponding to the at least one cluster of capacity stations and the second number of beams,
    wherein each of the at least one cluster of capacity stations and the beam corresponding to the cluster have a same coverage area; and
    if there are at least two of the dormant capacity stations, of which direction angles are smaller than a third pre-set threshold, the at least two capacity stations of which direction angle are smaller than the third pre-set threshold form one cluster of capacity stations.

6. The coverage station according to claim 4, wherein the processor is further configured to:
    represent the coverage relationship between the dormant capacity stations and the beams as an incidence matrix, wherein a correlation coefficient of the incidence matrix represents a ratio of an area where the coverage area of the dormant capacity station overlaps the coverage area of the beam corresponding to the capacity station, to the coverage area of the dormant capacity station.

7. The coverage station according to claim 6, wherein determining dormant capacity stations which need to be activated according to the load information and the coverage relationship between the dormant capacity stations and the beams comprises:
for an arbitrary beam of the beams, acquiring a dormant capacity station corresponding to the arbitrary beam when the dormant capacity station corresponding to the arbitrary beam needs to be activated according to load information of the arbitrary beam;
determining whether a dormant capacity station corresponding to a beam adjacent to the arbitrary beam needs to be activated; and
if the dormant capacity station corresponding to the beam adjacent to the arbitrary beam needs to be activated, acquiring the dormant capacity station corresponding to the beam adjacent to the arbitrary beam, calculating, for each dormant capacity station corresponding to the arbitrary beam, a sum of a correlation coefficient corresponding to the arbitrary beam and a correlation coefficient corresponding to the adjacent beam, and selecting, from the dormant capacity stations corresponding to the arbitrary beam, a dormant capacity station, which has a maximal sum of correlation coefficients, as the dormant capacity station which needs to be activated with the arbitrary beam; or
if the dormant capacity station corresponding to the beam adjacent to the arbitrary beam does not need to be activated, determining the dormant capacity station with a maximal correlation coefficient which corresponds to the arbitrary beam as the capacity station in the dormant state which needs to be activated with the arbitrary beam.

8. The coverage station according to claim 4, wherein the processor is further configured to:
if antennas of the coverage station are all installed on a central transmitting tower in a cell of the coverage station, transmit the beams through antennas of the central transmitting tower;
if the antennas of the coverage station are dispersedly installed on at least one transmitting tower in the cell of the coverage station, determine transmitting tower(s) for transmitting the beams from the at least one transmitting tower, and transmit the beams through the antennas of the determined transmitting tower(s).

9. The coverage station according to claim 4, wherein the processor is further configured to:
detect powers of signals received through the beams; and
acquire intensities of the loads in the coverage area of the beams according to the powers of the signals received through the beams.

10. A method for a coverage station to activate dormant capacity stations which need to be activated, comprising:
setting beams for dormant capacity stations according to positions and coverage areas of the dormant capacity stations when it is detected that a load of the coverage station is greater than a predetermined value;
transmitting the beams and collecting load information corresponding to the beams;
determining dormant capacity stations which need to be activated according to the load information and a coverage relationship between the dormant capacity stations and the beams; and
activating the dormant capacity stations which need to be activated using respective beams corresponding to the dormant capacity stations which need to be activated;
wherein when a quantity of dormant capacity stations is greater than a first pre-set threshold, setting the beams for dormant capacity stations further comprises:
pre-setting a first number of beams for dormant capacity stations, wherein if the first number of beams is greater than a second pre-set threshold, the beams are formed using the first number of beams.

11. The method according to claim 10, wherein if the pre-set first number is smaller than the second pre-set threshold, and part of the dormant capacity stations form at least one cluster of capacity stations, one beam is set for each cluster of capacity stations of the at least one cluster of capacity stations and a second number of beams are set for the rest of the dormant capacity stations;
wherein each of the at least one cluster of capacity stations and the beam corresponding to the respective cluster have a same coverage area; and
wherein if there are at least two dormant capacity stations, of which direction angles are smaller than a third pre-set threshold, the at least two capacity stations of which direction angles are smaller than the third pre-set threshold form one cluster of capacity stations.

12. The method according claim 10, further comprising:
representing the coverage relationship between the dormant capacity stations and the set of beams to be transmitted as an incidence matrix, wherein a correlation coefficient of the incidence matrix represents a ratio of an area where the coverage area of the dormant capacity station overlaps the coverage area of the beam in the set of beams to be transmitted corresponding to the capacity station, to the coverage area of the dormant capacity station.

13. The method according to claim 12, wherein determining dormant capacity stations which need to be activated according to the load information and the coverage relationship between the dormant capacity stations and the beams comprises:
for an arbitrary beam of the beams, acquiring a dormant capacity station corresponding to the arbitrary beam when the dormant capacity station corresponding to the arbitrary beam needs to be activated according to load information of the arbitrary beam;
determining whether a dormant capacity station corresponding to a beam adjacent to the arbitrary beam needs to be activated; and
if the dormant capacity station corresponding to the beam adjacent to the arbitrary beam needs to be activated, acquiring the dormant capacity station corresponding to the beam adjacent to the arbitrary beam, calculating, for each dormant capacity station corresponding to the arbitrary beam, a sum of a correlation coefficient corresponding to the arbitrary beam and a correlation coefficient corresponding to the adjacent beam, and selecting, from the dormant capacity stations corresponding to the arbitrary beam, a dormant capacity station, which has a maximal sum of correlation coefficients, as the dormant capacity station which needs to be activated with the arbitrary beam; or
if the dormant capacity station corresponding to the beam adjacent to the arbitrary beam does not need to be activated, determining the dormant capacity station with a maximal correlation coefficient which corresponds to the arbitrary beam as the capacity station in the dormant state which needs to be activated with the arbitrary beam.

14. The method according to claim 10, wherein transmitting the beams comprises:
if antennas of the coverage station are all installed on a central transmitting tower in a cell of the coverage station, transmitting the beams through the central transmitting tower; or
if the antennas of the coverage station are dispersedly installed on at least one transmitting tower in the cell of the coverage station, determining transmitting tower(s) for transmitting the beams from the at least one transmitting tower, and transmitting the beams through the antennas of the determined transmitting tower(s).

15. The method according to claim 10, wherein collecting load information corresponding to the beams comprises:
detecting powers of signals received through the beams; and
acquiring intensities of the loads in the coverage area of the beams according to the powers of the signals received through the beams.

* * * * *

UNITED STATES PATENT AND TRADEMARK OFFICE
CERTIFICATE OF CORRECTION

PATENT NO. : 9,674,709 B2
APPLICATION NO. : 14/805322
DATED : June 6, 2017
INVENTOR(S) : Wu et al.

It is certified that error appears in the above-identified patent and that said Letters Patent is hereby corrected as shown below:

In the Claims

Column 26, Line 14, "beams for dormant capacity stations" should read -- set beams for dormant capacity stations --.

Signed and Sealed this
Thirty-first Day of October, 2017

Joseph Matal
*Performing the Functions and Duties of the
Under Secretary of Commerce for Intellectual Property and
Director of the United States Patent and Trademark Office*